US007917745B2

(12) United States Patent
Janes

(10) Patent No.: US 7,917,745 B2
(45) Date of Patent: *Mar. 29, 2011

(54) NETWORK COMMUNICATIONS SECURITY AGENT

(75) Inventor: Sherman M. Janes, Portland, OR (US)

(73) Assignee: Intertrust Technologies Corporation, Sunnyvale, CA (US)

( * ) Notice: Subject to any disclaimer, the term of this patent is extended or adjusted under 35 U.S.C. 154(b) by 270 days.

This patent is subject to a terminal disclaimer.

(21) Appl. No.: 12/272,635

(22) Filed: Nov. 17, 2008

(65) Prior Publication Data

US 2009/0125712 A1    May 14, 2009

Related U.S. Application Data

(63) Continuation of application No. 11/846,447, filed on Aug. 28, 2007, now Pat. No. 7,454,609, which is a continuation of application No. 09/544,493, filed on Apr. 7, 2000, now Pat. No. 7,266,681.

(51) Int. Cl.
*H04L 29/06* (2006.01)

(52) U.S. Cl. ........ 713/151; 709/229; 709/228; 709/225; 709/223

(58) Field of Classification Search .................. None
See application file for complete search history.

(56) References Cited

U.S. PATENT DOCUMENTS

| 4,827,508 | A | 5/1989 | Shear |
|---|---|---|---|
| 4,977,594 | A | 12/1990 | Shear |
| 5,050,213 | A | 9/1991 | Shear |
| 5,410,598 | A | 4/1995 | Shear |
| 5,455,953 | A | 10/1995 | Russell |
| 5,530,235 | A | 6/1996 | Stefik et al. |
| 5,534,975 | A | 7/1996 | Stefik et al. |
| 5,629,980 | A | 5/1997 | Stefik et al. |
| 5,634,012 | A | 5/1997 | Stefik et al. |
| 5,638,443 | A | 6/1997 | Stefik et al. |
| 5,715,403 | A | 2/1998 | Stefik |
| 5,818,936 | A | 10/1998 | Mashayekhi |
| 5,870,474 | A | 2/1999 | Wasilewski et al. |
| 5,872,847 | A | 2/1999 | Boyle et al. |
| 5,892,900 | A | 4/1999 | Ginter et al. |
| 5,893,910 | A | 4/1999 | Martineau et al. |
| 5,910,987 | A | 6/1999 | Ginter et al. |

(Continued)

FOREIGN PATENT DOCUMENTS

EP    0 715 247 A1    6/1996

(Continued)

OTHER PUBLICATIONS

Sibert, O. et al., "Digibox: A Self-Protecting Container for Information Commerce," Proceedings of the First USENIX Workshop on Electronic Commerce, Jul. 1995, 13 pages, New York, NY.

(Continued)

*Primary Examiner* — Pramila Parthasarathy
(74) *Attorney, Agent, or Firm* — Finnegan, Henderson, Farabow, Garrett & Dunner LLP

(57) ABSTRACT

One embodiment of an inventive networking environment includes clients called sending clients because they send network content through a network, and clients called receiving clients because they receive the network content from the sending clients through the network. Both sending clients and receiving clients are "clients" in that they rely on a management server to orchestrate the secure transfer of information from sending clients to receiving clients.

40 Claims, 15 Drawing Sheets

U.S. PATENT DOCUMENTS

| | | | |
|---|---|---|---|
| 5,915,019 A | 6/1999 | Ginter et al. |
| 5,917,912 A | 6/1999 | Ginter et al. |
| 5,920,861 A | 7/1999 | Hall et al. |
| 5,935,212 A | 8/1999 | Kalajan et al. |
| 5,940,504 A | 8/1999 | Griswold |
| 5,941,947 A | 8/1999 | Brown et al. |
| 5,943,422 A | 8/1999 | Van Wie et al. |
| 5,949,876 A | 9/1999 | Ginter et al. |
| 5,982,891 A | 11/1999 | Ginter et al. |
| 5,999,949 A | 12/1999 | Crandall |
| 6,038,322 A | 3/2000 | Harkins |
| 6,058,418 A | 5/2000 | Kobata |
| 6,085,238 A | 7/2000 | Yuasa et al. |
| 6,098,056 A | 8/2000 | Rusnak et al. |
| 6,108,703 A | 8/2000 | Leighton et al. |
| 6,108,706 A | 8/2000 | Birdwell et al. |
| 6,112,181 A | 8/2000 | Shear et al. |
| 6,112,192 A | 8/2000 | Capek |
| 6,115,712 A | 9/2000 | Islam et al. |
| 6,138,119 A | 10/2000 | Hall et al. |
| 6,138,162 A | 10/2000 | Pistriotto et al. |
| 6,138,235 A | 10/2000 | Lipkin et al. |
| 6,151,061 A | 11/2000 | Tokuhashi |
| 6,157,721 A | 12/2000 | Shear et al. |
| 6,170,061 B1 | 1/2001 | Beser |
| 6,185,683 B1 | 2/2001 | Ginter et al. |
| 6,215,878 B1 | 4/2001 | Harkins |
| 6,216,132 B1 | 4/2001 | Chandra et al. |
| 6,223,286 B1 | 4/2001 | Hashimoto |
| 6,226,030 B1 | 5/2001 | Harvey et al. |
| 6,237,786 B1 | 5/2001 | Ginter et al. |
| 6,240,185 B1 | 5/2001 | Van Wie et al. |
| 6,253,193 B1 | 6/2001 | Ginter et al. |
| 6,275,859 B1 | 8/2001 | Wesley et al. |
| 6,289,450 B1 | 9/2001 | Pensak et al. |
| 6,292,569 B1 | 9/2001 | Shear et al. |
| 6,330,595 B1 | 12/2001 | Ullman et al. |
| 6,330,671 B1 | 12/2001 | Aziz |
| 6,351,467 B1 | 2/2002 | Dillon |
| 6,363,488 B1 | 3/2002 | Ginter et al. |
| 6,385,647 B1 | 5/2002 | Willis et al. |
| 6,389,402 B1 | 5/2002 | Ginter et al. |
| 6,389,475 B1 | 5/2002 | Speakman et al. |
| 6,393,484 B1 | 5/2002 | Massarani |
| 6,427,140 B1 | 7/2002 | Ginter et al. |
| 6,438,549 B1 | 8/2002 | Aldred et al. |
| 6,438,618 B1 | 8/2002 | Lortz et al. |
| 6,449,367 B2 | 9/2002 | Van Wie et al. |
| 6,449,721 B1 | 9/2002 | Pensak et al. |
| 6,463,418 B1 | 10/2002 | Todd |
| 6,463,474 B1 * | 10/2002 | Fuh et al. ............... 709/225 |
| 6,467,090 B1 | 10/2002 | Brodigan |
| 6,470,354 B1 | 10/2002 | Aldridge et al. |
| 6,477,559 B1 | 11/2002 | Veluvali et al. |
| 6,507,727 B1 | 1/2003 | Henrick |
| 6,512,776 B1 | 1/2003 | Jones et al. |
| 6,519,615 B1 | 2/2003 | Wollrath et al. |
| 6,526,438 B1 | 2/2003 | Bienvenu et al. |
| 6,526,582 B1 | 2/2003 | Brodigan et al. |
| 6,606,706 B1 | 8/2003 | Li |
| 6,618,484 B1 | 9/2003 | Van Wie et al. |
| 6,640,304 B2 | 10/2003 | Ginter et al. |
| 6,658,568 B1 | 12/2003 | Ginter et al. |
| 6,668,325 B1 | 12/2003 | Collberg et al. |
| 6,785,815 B1 | 8/2004 | Serret-Avila et al. |
| 6,832,316 B1 | 12/2004 | Sibert |
| 2001/0042043 A1 | 11/2001 | Shear et al. |
| 2002/0023214 A1 | 2/2002 | Shear et al. |
| 2002/0048369 A1 | 4/2002 | Ginter et al. |
| 2002/0087859 A1 | 7/2002 | Weeks et al. |
| 2002/0112171 A1 | 8/2002 | Ginter et al. |
| 2002/0152173 A1 | 10/2002 | Rudd |
| 2003/0023856 A1 | 1/2003 | Horne et al. |
| 2003/0041239 A1 | 2/2003 | Shear et al. |
| 2003/0046244 A1 | 3/2003 | Shear et al. |
| 2003/0069748 A1 | 4/2003 | Shear et al. |
| 2003/0069749 A1 | 4/2003 | Shear et al. |
| 2003/0084003 A1 | 5/2003 | Pinkas et al. |
| 2003/0105721 A1 | 6/2003 | Ginter et al. |
| 2003/0163431 A1 | 8/2003 | Ginter et al. |
| 2004/0054630 A1 | 3/2004 | Ginter et al. |
| 2004/0059951 A1 | 3/2004 | Pinkas et al. |
| 2004/0073813 A1 | 4/2004 | Pinkas et al. |
| 2004/0103305 A1 | 5/2004 | Ginter et al. |
| 2004/0107356 A1 | 6/2004 | Shamoon et al. |
| 2004/0123129 A1 | 6/2004 | Ginter et al. |
| 2004/0133793 A1 | 7/2004 | Ginter et al. |
| 2005/0027871 A1 | 2/2005 | Bradley et al. |
| 2005/0050332 A1 | 3/2005 | Serret-Avila et al. |
| 2005/0060560 A1 | 3/2005 | Sibert |
| 2005/0060584 A1 | 3/2005 | Ginter et al. |
| 2005/0108555 A1 | 5/2005 | Sibert |

FOREIGN PATENT DOCUMENTS

| | | |
|---|---|---|
| WO | WO 96/27155 | 9/1996 |
| WO | WO 97/43761 | 11/1997 |
| WO | WO 98/09209 | 3/1998 |
| WO | WO 98/10381 | 3/1998 |
| WO | WO 98/37481 | 8/1998 |
| WO | WO 99/01815 | 1/1999 |
| WO | WO 99/24928 | 5/1999 |
| WO | WO 99/48296 | 9/1999 |
| WO | WO 00/75925 | 12/2000 |
| WO | WO 01/06374 | 1/2001 |
| WO | WO 01/09702 | 2/2001 |
| WO | WO 01/10076 | 2/2001 |

OTHER PUBLICATIONS

Sibert, O. et al., "Securing the Content, Not the Wire, for Information Commerce," 1996, 12 pages, InterTrust Technologies Corporation.

Stefik, M., "Introduction to Knowledge Systems, Chapter 7; Classification," 1995, pp. 543-607, Morgan Kaufmann Publishers, Inc., San Francisco, CA.

Stefik, M., "Letting Loose the Light: Igniting Commerce in Electronic Publication," 1994-1995, 36 pages, Xerox PARC, Palo Alto, CA.

Stefik, M., "Letting Loose the Light: Igniting Commerce in Electronic Publication," Internet Dreams: Archetypes, Myths, and Metaphors, 1996, pp. 219-253, Massachusetts Institute of Technology.

Stefik, M., "Trusted Systems," Scientific American, Mar. 1997, pp. 78-81.

Office Action mailed Jan. 29, 2004, in U.S. Appl. No. 09/544,493, filed Apr. 7, 2000.

Office Action mailed Nov. 23, 2004, in U.S. Appl. No. 09/544,493, filed Apr. 7, 2000.

Office Action mailed Oct. 5, 2005, in U.S. Appl. No. 09/544,493, filed Apr. 7, 2000.

Final Office Action mailed Mar. 29, 2006, in U.S. Appl. No. 09/544,493, filed Apr. 7, 2000.

Office Action mailed Oct. 18, 2006, in U.S. Appl. No. 09/544,493, filed Apr. 7, 2000.

Notice of Allowanced mailed Apr. 30, 2007, in U.S. Appl. No. 09/544,493, filed Apr. 7, 2000.

Office Action mailed May 29, 2008 for related U.S. Appl. No. 11/846,447, filed Aug. 28, 2007.

Notice of Allowance mailed Sep. 29, 2008 for related U.S. Appl. No. 11/846,447, filed Aug. 28, 2007.

* cited by examiner

NETWORK COMMUNICATIONS SECURITY AGENT

RELATED CASES

This is a continuation of application Ser. No. 11/846,447, filed Aug. 28, 2007now U.S. Pat. No. 7,454,609, which is a continuation of application Ser. No. 09/544,493, filed Apr. 7, 2000, now Pat. No. 7,266,681, both of which are incorporated herein by reference in their entireties.

This application is also related to application Ser. No. 09/544,898, filed on Apr. 7, 2000, now U.S. Pat. No. 6,973,499.

This application is also related to application Ser. No. 09/544,795, filed on Apr. 7, 2000, now U.S. Pat. No. 7,085,839.

FIELD OF THE INVENTION

The present invention pertains to the field of networking. More particularly, this invention relates to distribution of network content.

BACKGROUND OF THE INVENTION

Traditional approaches to network content management are widely used today by a variety of entities such as pay television providers, corporate networks, and members only Internet websites. These traditional approaches usually rely on maintaining groups of users who are eligible to receive certain content. Many different kinds of relationships and security schemes are used to associate users and content. For instance, a corporate network may include several different groups of users who are eligible to access different groups of content based on job description and need to know. A vice president of corporation finance may belong to one group of users that has access to financial files, and an engineer may belong to another group of users that has access to a completely separate set of purely technical files. All of the corporate users may belong to yet another group of users that has access to general corporate information like a community bulletin board, a schedule of company social events, etc. Depending on who a user is, the user may or may not have authority to read, write, execute, and/or delete content stored in a file structure on the network.

In a pay television network, certain viewers will have purchased only the basic television channels and other users will have purchased one or more premium channels or packages of channels, such as sports packages for particular professional teams. Channels that a viewer has not paid for are generally scrambled. With potentially hundreds of thousand or even millions of viewers, and potentially hundreds of different channel packages, the associations and security controls among viewers and content are likely to be very complex.

As the number of users on a network increases, and as the volume of content distributed over the network increases, managing the distribution of content becomes more difficult. This is particularly true as networks become more interactive and more dynamic. The Internet provides a good example of a difficult network to manage. The size of the Internet and the dynamic nature of the Internet make content management particularly challenging.

The number of people and organizations connected to the Internet continues to increase virtually every day. At the same time, the volume of information available on the Internet continues to increase. People can add new content, delete content, decide to access different content, search for new content, etc., on the spur of the moment. A content provider never knows what to expect. If a content provider attracts too much attention, the provider can become overwhelmed with traffic, essentially shutting down the provider. On the other hand, a content provider can easily become lost in the vast virtual expense of the Internet and receive very little traffic if any at all.

As the Internet and broadcast services merge, the content management challenges will continue to increase. For instance, for an existing pay television network, the number of users and volume of content is likely to be large, but the content and user groups are comparatively static. That is, the pay television provider can usually predict what television channels it is going to provide, and the typical user probably will not change his or her package of channels very often. Changes to content and user groups can be managed over the course of days or weeks.

In an Internet environment, however, the dynamic nature of user groups and content could drastically change. An Internet-based pay television service could be entirely pay-per-view, resulting in huge fluctuations in the number of users. For instance, the release of a particularly popular movie could attract too many viewers and shut down the content server. Multicasting can alleviate some of the difficulties with network content that is in high demand by transmitting a data stream that viewers can simply pick up in the network, analogous to a broadcast television signal from an antenna. Providing security for a multicast, however, provides additional changes. A large number of viewers may want to access the content, and each viewer will generally need to obtain a decryption key from the content provider in order to make use of the data stream. A large number of requests for decryption keys can overwhelm a server just like a large number of requests for any other kind of data.

BRIEF DESCRIPTION OF THE DRAWINGS

Examples of the present invention are illustrated in the accompanying drawings. The accompanying drawings, however, do not limit the scope of the present invention. Similar references in the drawings indicate similar elements.

DETAILED DESCRIPTION

In the following detailed description, numerous specific details are set forth in order to provide a thorough understanding of the present invention. However, those skilled in the art will understand that the present invention may be practiced without these specific details, that the present invention is not limited to the depicted embodiments, and that the present invention may be practiced in a variety of alternate embodiments. In other instances, well known methods, procedures, components, and circuits have not been described in detail.

Parts of the description will be presented using terminology commonly employed by those skilled in the art to convey the substance of their work to others skilled in the art. Also, parts of the description will be presented in terms of operations performed through the execution of programming instructions. As well understood by those skilled in the art, these operations often take the form of electrical, magnetic, or optical signals capable of being stored, transferred, combined, and otherwise manipulated through, for instance, electrical components.

Various operations will be described as multiple discrete steps performed in turn in a manner that is helpful in understanding the present invention. However, the order of description should not be construed as to imply that these operations are necessarily performed in the order they are presented, or even order dependent. Lastly, repeated usage of the phrase "in one embodiment" does not necessarily refer to the same embodiment, although it may.

The networking environment described below embodies a number of inventions for improving network content management. Embodiments of one invention are claimed in the present patent and embodiments of other inventions are claimed in the related patents.

Figure 1:
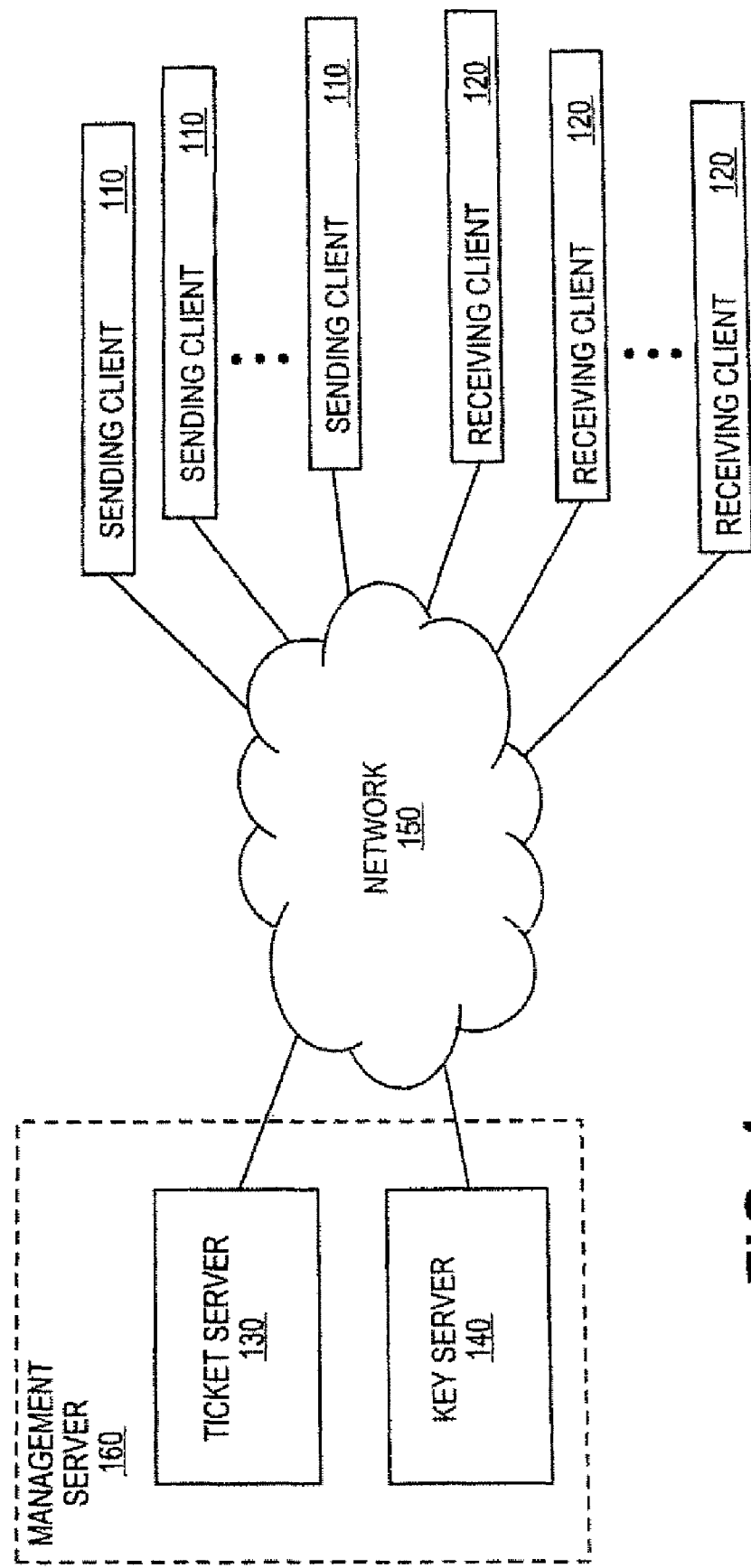
FIG. 1 illustrates one embodiment of a network environment.

FIG. 1 illustrates one embodiment of the inventive networking environment. Clients 110 are called sending clients because they send network content through network 150. Clients 120 are called receiving clients because they receive the network content from the sending clients through network 150. Both sending clients 110 and receiving clients 120 are "clients" in that they rely on management server 160 to orchestrate the secure transfer of information from sending clients 110 to receiving clients 120.

Relying on management server 160 to orchestrate content management provides numerous advantages. One advantage in particular is that managing access to content at a server reduces the volume of data traffic on individual clients.

Management server 160 includes ticket server 130 and key server 140. In the illustrated embodiment, management server 160 is shown in dotted lines because ticket server 130 and key server 140 need not be located together. That is, key server 140 and ticket server 130 can be located at separate locations and on separate machines. In various embodiments, as discussed below, key server 140 may be located in a secure location to reduce the likelihood of tampering with keying information.

Network content can represent any form of data, including data files, multicast data, multimedia data, interactive data, etc. Network content will usually be referred to herein as events or sessions. Examples of events are a multicast presentation of a feature length movie, providing access to a file, and providing access to an interactive gaming environment.

In one embodiment, network 150 represents the Internet. In alternate embodiments, network 150 represents a private or corporate network.

Various embodiments of the inventive networking environment are particularly suited for multicasting events, although they work well for unicast events too. Multicasting is a data transmission from one sending client 110 to multiple receiving clients 120. Each client accesses ticket server 130 to be authorized for the event. If a client is authorized, it will learn when and where a multicast event will occur as well as where to go to get a security key to participate in the event. In the illustrated embodiment, each client is instructed to get the security key from key server 140. Alternate embodiments may include several different key servers 140 located throughout network 150, and each key server may be associated with different events or sets of events in order to distribute the server load for key requests.

Around the time a multicast event is supposed to start, each authorized client accesses key server 140 to obtain a key for the event. In one embodiment, the key is a "symmetric" cryptographic key. A key is "symmetric" in that both the sending client and the receiving client use the same key. When the event actually begins, the sending client uses the key to encrypt the multicast and each receiving client uses the key to decrypt it.

Figure 2:
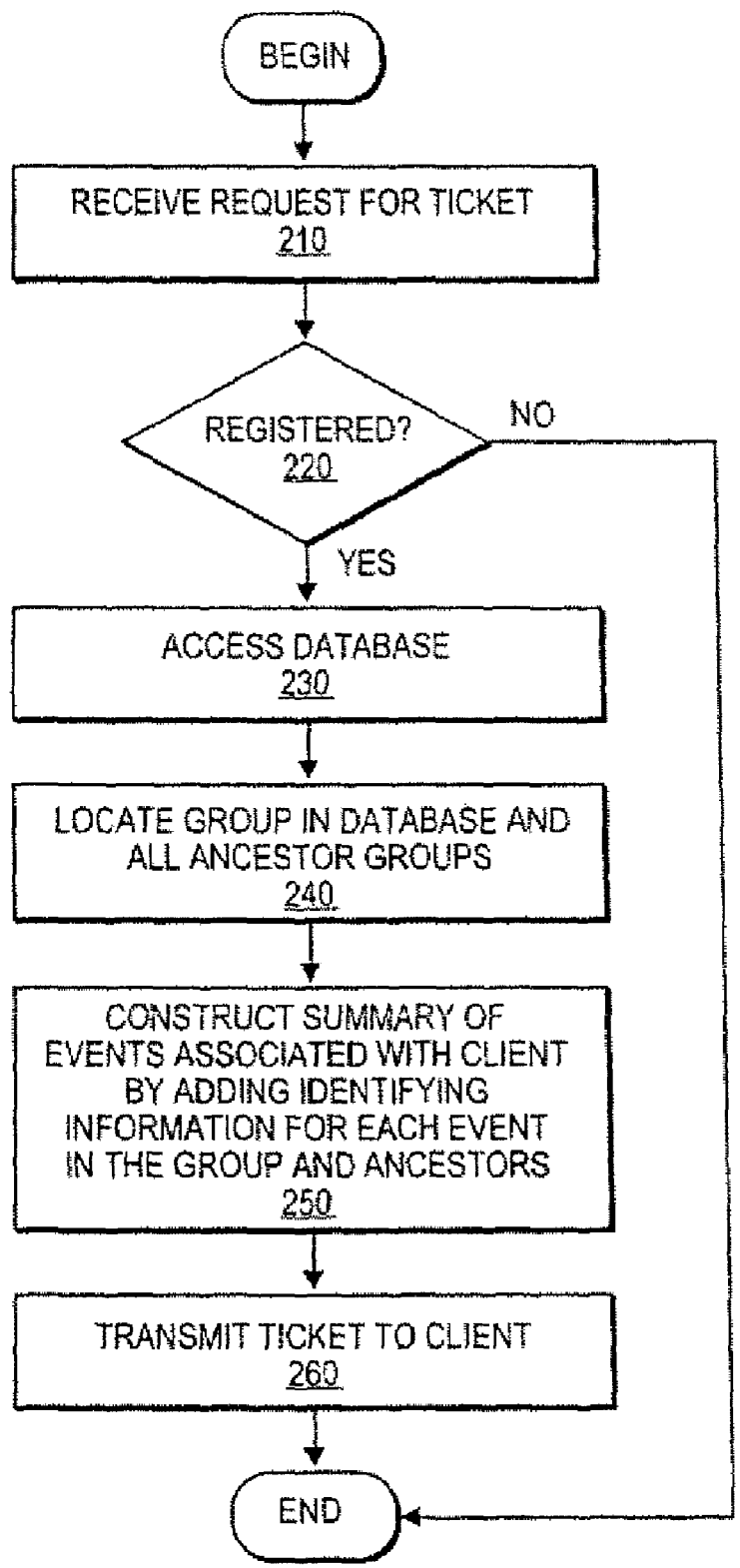
FIG. 2 demonstrates one embodiment of a ticket server.

FIG. 2 demonstrates one inventive embodiment of ticket server 130 in greater detail. As with all of the described figures, certain embodiments may include less elements, combine one or more elements, change the order of elements, and/or add to the elements shown in FIG. 2. In the illustrated embodiment however, the ticket server receives a request in block 210 from a client and in block 220 determines if the client is registered. In one embodiment, determining if the client is registered involves accessing a database of registered clients to see if the client appears in the database. This could include requiring the client to provide a login name and a password or some other verification such as a smart card. As discussed below, the request may actually pass through one or more stages of application specific client care handling before reaching ticket server 130. In which case, a client care application may determine whether or not a client is registered rather than ticketing server 130. In any case, if the client is not registered, the client is prevented from proceeding.

In block 230, the ticket server accesses a database. The database defines associations between registered users and events. Skipping briefly to FIG. 3, one embodiment of a database is illustrated. The illustrated database represents a directed acyclic graph of groups. Each group, G1 through G6, has assigned to it one or more events and clients. For instance, event E1 and client C1 are assigned to group G1. Each client assigned to a group is associated with all of the events assigned to the group. For instance, client C1 is associated with event E1. Client C1 is likely to be a sending client that can send event E1.

The database is directed and hierarchical in that clients are not only associated with events assigned to the group, but are also associated with events assigned to "ancestor" groups. An ancestor group is a group at a higher level of the hierarchy from which a current group depends. The directed nature of the database is indicated by the arrows. Group associations follow the direction of the arrows. From a given group, associated events can be accumulated by backtracking up the arrows to the root node. For instance, client C7 is assigned to group G6 so client C7 is associated with events E7 and E8 because they are assigned to the same group. Backtracking the arrow up to group G4, client C7 is also associated with event E5, and continuing up to root group G1, client C7 is also associated with event E1.

An association can apply either for sending or receiving an event. That is, with respect to one event, a client may be a sending client, and with respect to another event, a client may be a receiving client.

Figure 3:
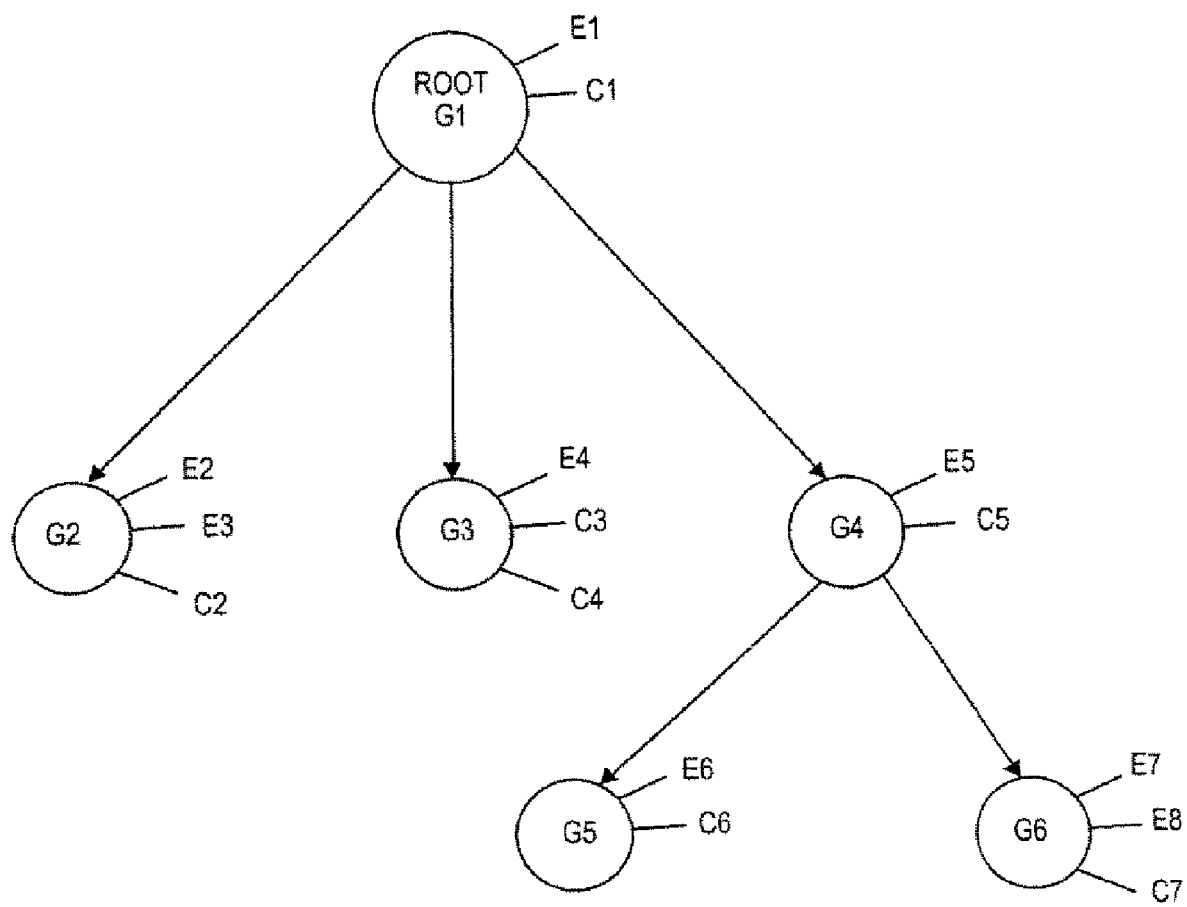
FIG. 3 illustrates one embodiment of a database.

Using a database such as the one described in FIG. 3, a summary of events to which a client is associated can be quickly constructed by following the flow directed hierarchy.

Returning to FIG. 2, in block 240, ticket server 130 locates a group to which the client is assigned and all ancestor groups. Based on the located groups, ticket server 130 constructs a summary of events associated with the client in block 250. As events are identified in the associated groups, information identifying each event is added to the summary.

Figure 4:
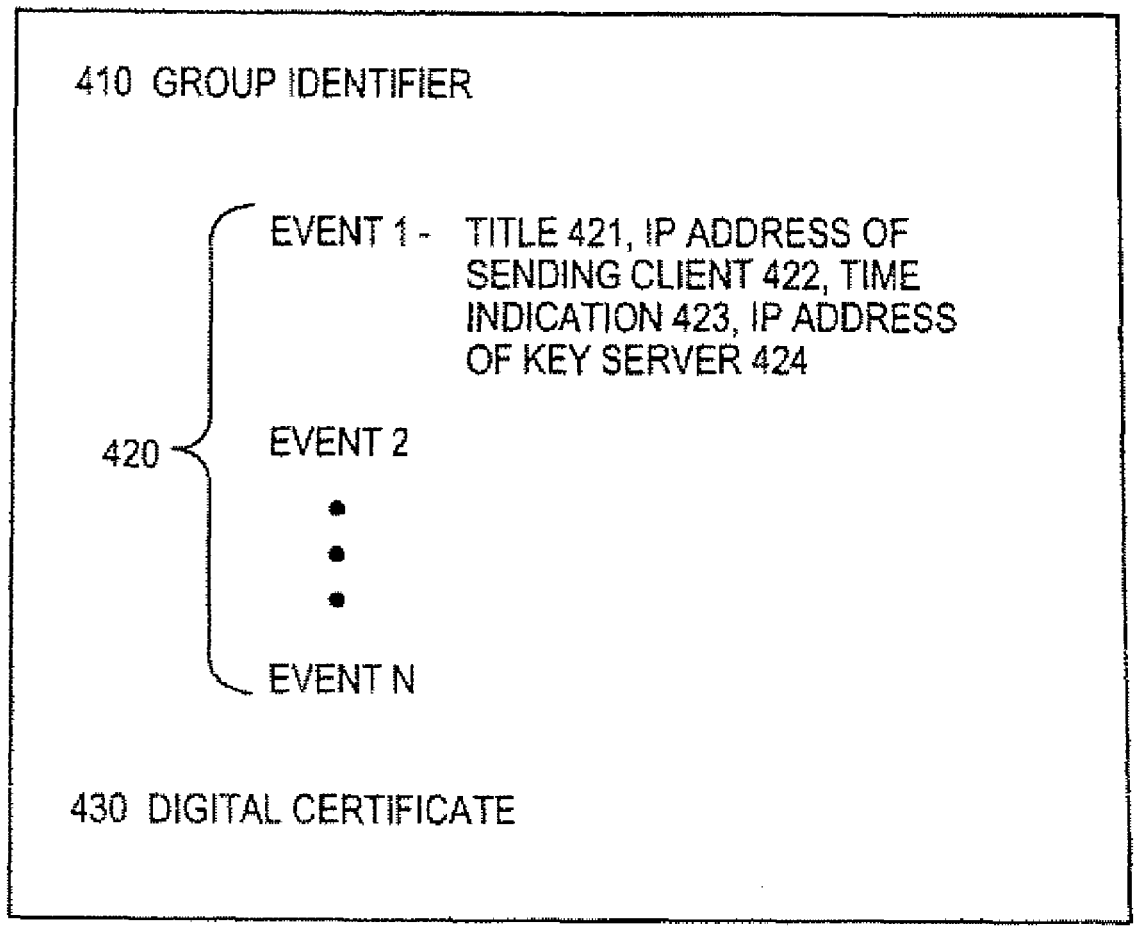
FIG. 4 illustrates one embodiment of a ticket.

Skipping briefly to FIG. 4, one embodiment of a ticket is illustrated. The illustrated ticket includes a group identifier 410. In one embodiment, all clients associated with the same group are given the same ticket. Below the group identifier, the ticket includes a list 420 of all the events, 1 through N, associated with the identified group. Each event is identified by title information 421, and each event summary includes an internet protocol (IP) address of the sending client 422 for the particular event, a time indication 423 for the particular event, and an IP address for the key server 424 that stores the encryption keys for the particular event. Alternate embodiments may include another IP destination address which in the multicast case is an IP Multicast Group address. Where all of the clients associated with a given group get the same address, a sending client will likely see its own IP address in that field. The time indicator can be a fairly complex expression. For instance, the event could repeat on a daily or weekly basis, or on certain days of the month or year.

In addition to group identifier 410 and list 420, the illustrated ticket includes digital certificate 430. Digital certificate 430 may include a digital "hash" of list 420 and may certify that the client is authorized to access a key for any of the listed events. In alternate embodiments, different digital certificates can be used for each event in list 420.

Returning again to FIG. 2, in block 260, ticket server 130 transmits the ticket, including the summary of associated clients to the client. As discussed below, a client handling system may operate between the ticket server and the actual client. In which case, ticket server 130 should transmit the ticket to the client through the client handling system.

Ticket server 130 provides a convenient way for clients to see which events are available. In alternate embodiments, in addition to or in place of providing tickets in response to requests, ticket server 130 may be configured to issue tickets under certain circumstances. For instance, for each client or for selected clients, ticket server 130 may issue tickets on a regular basis and/or whenever associated events change. Additionally, events could be prioritized based, for instance, on to which group an event is assigned. In which case, depending on the priority of a particular event, ticket server 130 may or may not issue a ticket to one or more clients based on a change in the event.

Figure 5:
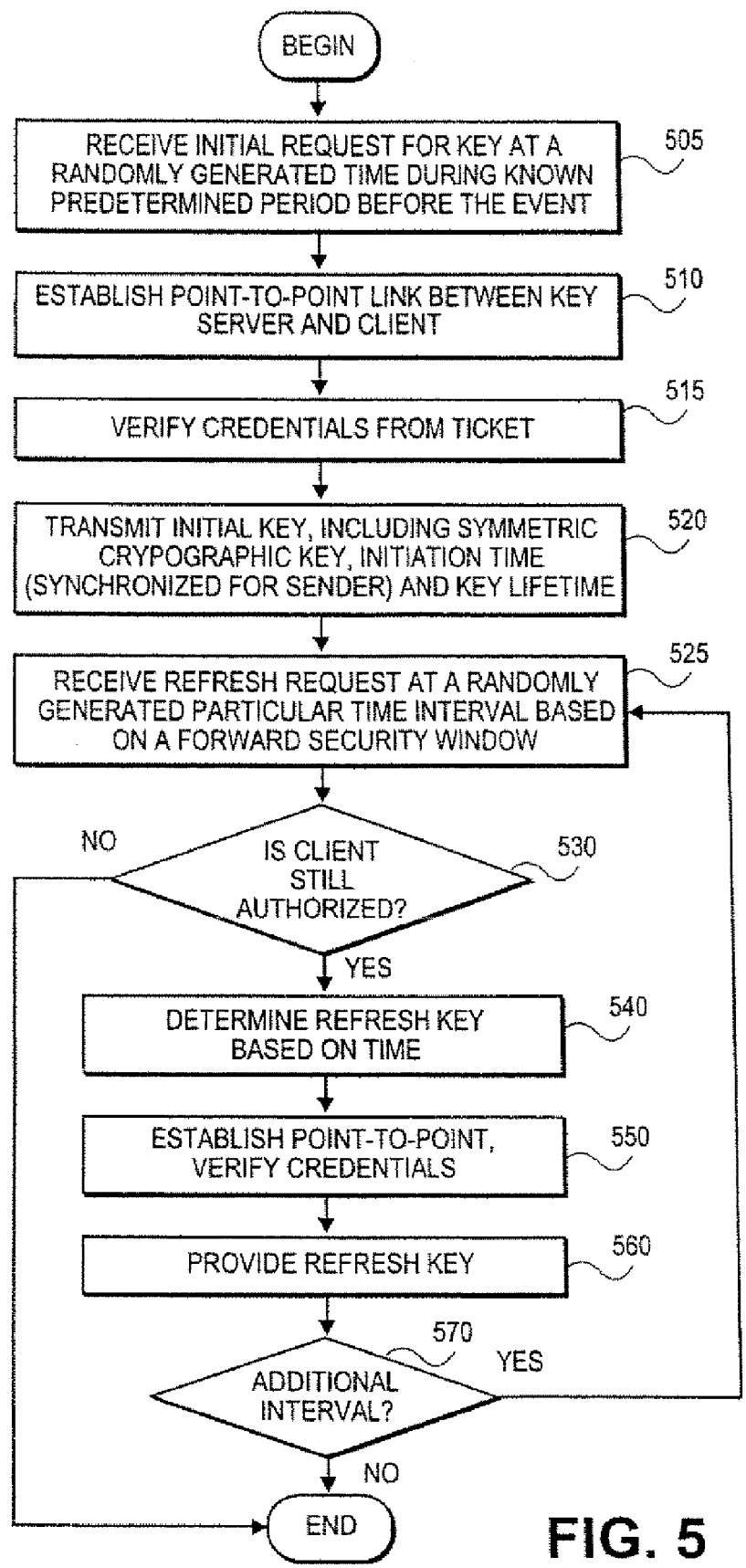
FIG. 5 demonstrates one embodiment of a key server.

Turning now to FIG. 5, one inventive embodiment of key server 140 is demonstrated. In block 505, an initial request for a key is received from a client. The initial request is received at a randomly generated instant in time during a predetermined period before the start of the event. For instance, skipping briefly to FIG. 6, the timing of one embodiment of an event is illustrated. The event will begin at the event start time 610. The predetermined period before the event start time 610 is the initial keying period 620. The request is received at some instant in time during the initial keying period 620, and the instant in time is randomly generated by the client.

In alternate embodiments, a client may access the event late. In which case, the initial request may not be received during the initial keying period 620. If a client accesses an event late, the first part of the event may not be accessible until the client receives a key.

Referring back to FIG. 5, in block 510, key server 140 establishes a point-to-point secure link with the client. In block 515, key server 140 verifies the clients credentials which are included in the request from the ticket. Any number of secure link protocols can be used, either initiated by key server 140 or the client that issued the request.

In block 520, an initial key is transmitted to the client. In the illustrated embodiment, the key includes a symmetric cryptographic key as discussed above. That is, both the sending and receiving clients use the same key to encrypt and decrypt. In addition to the cryptographic key, the illustrated embodiment includes an initiation time for the key and a life time for the key after the key is initiated.

The initiation time and life time for the key are more important for a sending client. This is because the key server and the sending client need to coordinate or synchronize which keys are made available to receiving clients and when. Therefore, a sending client and a server need to have somewhat synchronized clocks. Any number of techniques can be used to synchronize the time of day between the key server and the sending client.

A receiving client, in contrast, can just implement a key as soon as the key is received. Or, if a received key is not yet in use when the key is received, a receiving client can simply store the key until the key comes into use. Any number of techniques can be used to age a stored key so that it is not stored indefinitely if for some reason an event corresponding to the key never initiates.

In block 525, a refresh request is received. Refreshing involves changing keys after a certain duration. Refreshing, also referred to as re-keying, severs at least two purposes. First, for cryptographic reasons, it is a good idea to change keys from time to time. The longer a key is used, the more likely it is that someone will be able to crack the key and access the event without authorization. The more often keys are changed, the better the security.

A second purpose for refreshing is access revocation. That is, if a user stops being authorized to access an event part way through the event, the next time the key is refreshed for the event, the key server can prevent the user from having future access by not sending the refresh key. For example, the event may be a continuous stream, like a multicast of an all news pay television station. Keys may be refreshed at one hour intervals. If, at some point in time, a receiving client fails to pay his bill, a client care system may recognize the missed payment and send a notification to the key server indicating that the client is no longer authorized. In response to which the key server can withhold the next refresh key, effectively revoking access. For instance, referring again to FIG. 6, the event starts at event start time 610. At the end of each event interval 630, the client switches to a new key retrieved from the key server.

Figure 6:
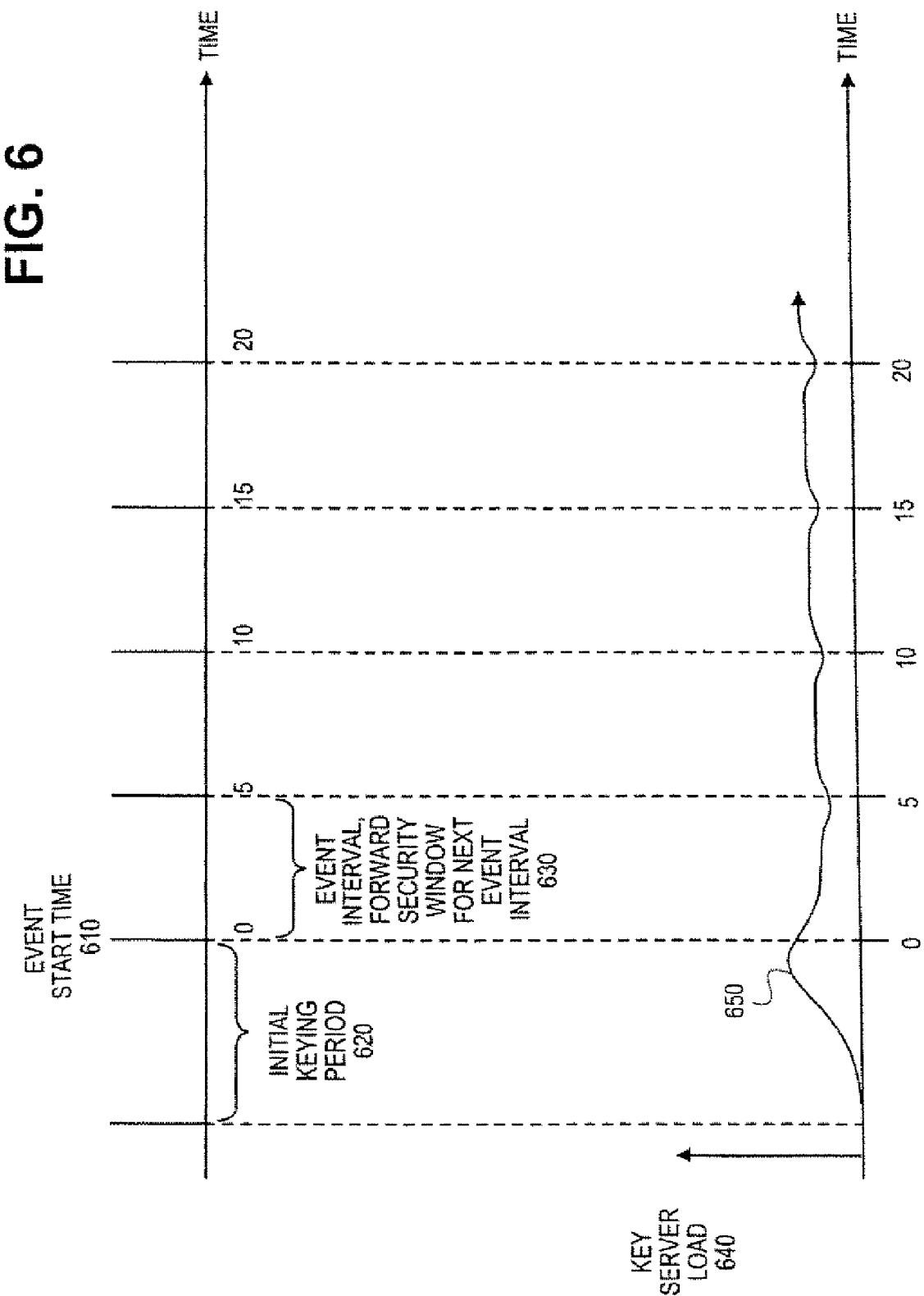
FIG. 6 illustrates event intervals and associated key server load.

As illustrated in FIG. 6, the event interval 630 is also the forward security window for the next event interval 630. That is, while the client is sending or receiving content using the current key during the current event interval, the client also accesses the key server during the forward security window to get the next refresh key. In alternate embodiments, the event interval and the forward security window do not exactly coincide. That is, the forward security window may be shorter or longer than the event interval, and the client may retrieve keys from the key server more than one event internal in advance.

Referring back to FIG. 5, still with reference to block 525, the refresh request is received at some random point in time during the forward security window. That is, the client generates a random access time during the first forward security window, and then advances the time by the duration of the event interval for each subsequent event interval. In this way, a given client will access the key server at a particular point in time with respect to the beginning of each event interval. In alternate embodiments, the client randomly generates a new access time for each forward security window.

By randomly distributing requests over the course of the event interval, the load on the key server when several clients are accessing the event is distributed over the course of the event interval. Similarly, the random instant in time during the initial keying period 620, in FIG. 6, during which the client requests the initial key, is intended to distribute the load on the key server over a period of time when many clients are accessing the key server at roughly the same time.

Distributing server load of the event intervals for refresh keys tends to work well. Unfortunately, as illustrated in FIG. 6, distributing a first request for an initial key when many requests are being processed is not always successful. Many human users of client systems are prone to wait until the last minute before the beginning of an event to try to access keys for the event. These last minute user can cause a peak 650 in the key server load 640, potentially overwhelming the key server.

Various embodiments of clients include agents for automatically accessing the key server at a random time during the initial keying period, but unless the human user has the machine turned on so that the agent can operate, no request will be made. For instance, home users are less likely to leave their machines turned on than business users. Home users are more likely to turn their machines on just moments before an event. Business users will probably not experience potential problems like peak 650 since business users often leave their machines on, allowing automatic client agents to perform the initial keying.

Figure 7:
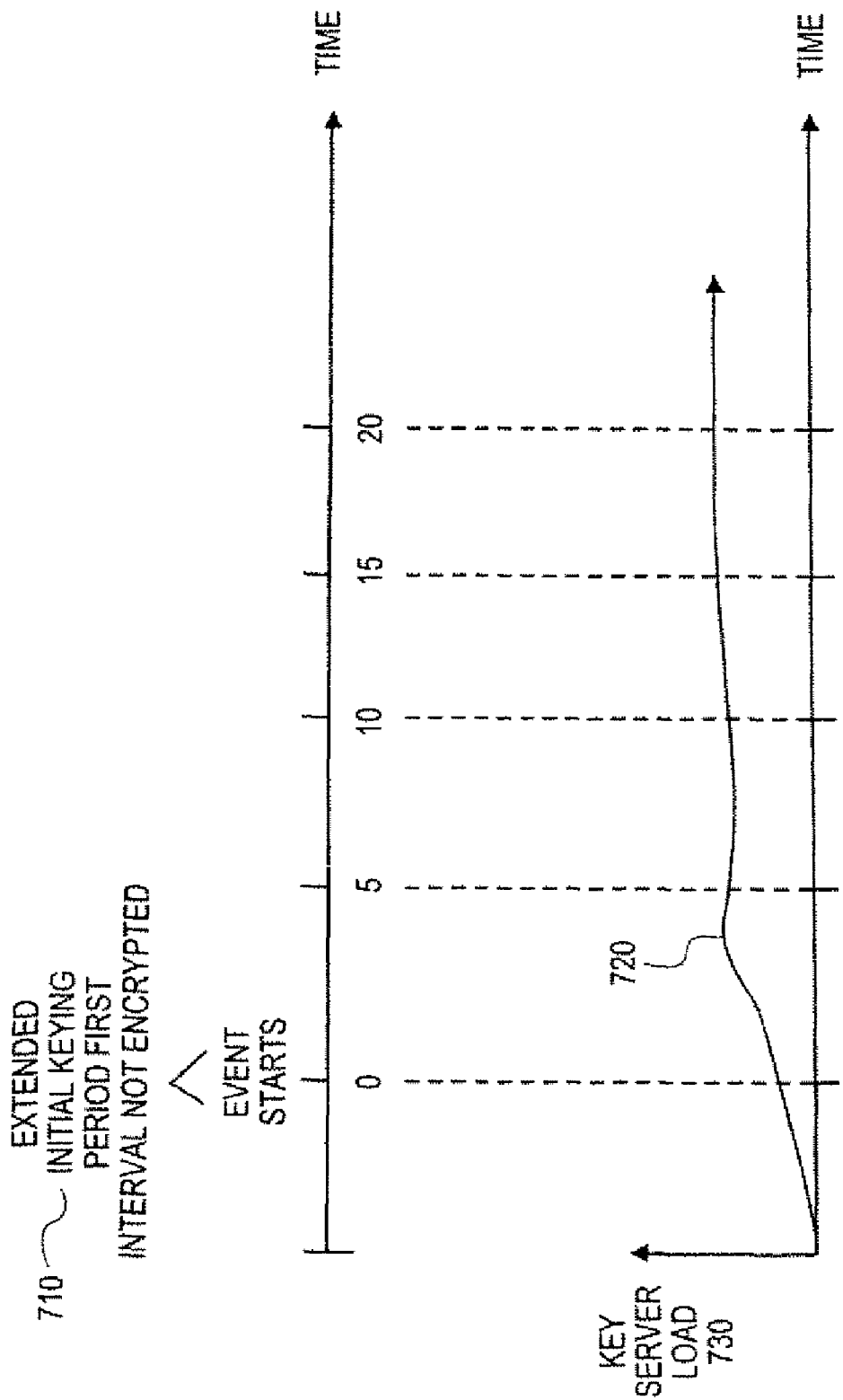
FIG. 7 illustrates event intervals and associated key server load.

FIG. 7 illustrates an embodiment of an alternate inventive approach to initial keying. In FIG. 7, the first interval after the event starts is not encrypted so that last-minute clients can begin watching the event. Any time during the extended initial keying period 710 a client can access the key server and retrieve the initial key. By allowing access to the first interval unencrypted, the load 730 on the key server is flattened out somewhat, reducing the peak load 720 compared to the approach described in FIG. 6. In alternate embodiments, more than one interval could be transmitted without encryption, or a first unencrypted interval could be longer or shorter than the rest of the event intervals.

Referring back once again to FIG. 5, now with reference to block 530, the key server checks to see if the client is still authorized. If the client is not authorized, the refresh key is not sent or, in another embodiment, not all of the necessary information is included in the refresh key that is sent to the client to effective revoke access. If the client is still authorized, the key server determines which key to send based on the current time in block 540. That is, as discussed above, for a sending client, the key server and the sending client need to be fairly closely synchronized in time so that the key server can provide the correct keys at the correct time.

In block 550, the key server and the client establish a point-to-point secure link and verify credentials. In block 560, the key server provides the refresh key over the secure link. In block 570, if there is another event interval, the process returns to block 525 to wait for the next refresh request. If there are no additional event intervals after the current one in block 570, the process ends.

Figure 8:
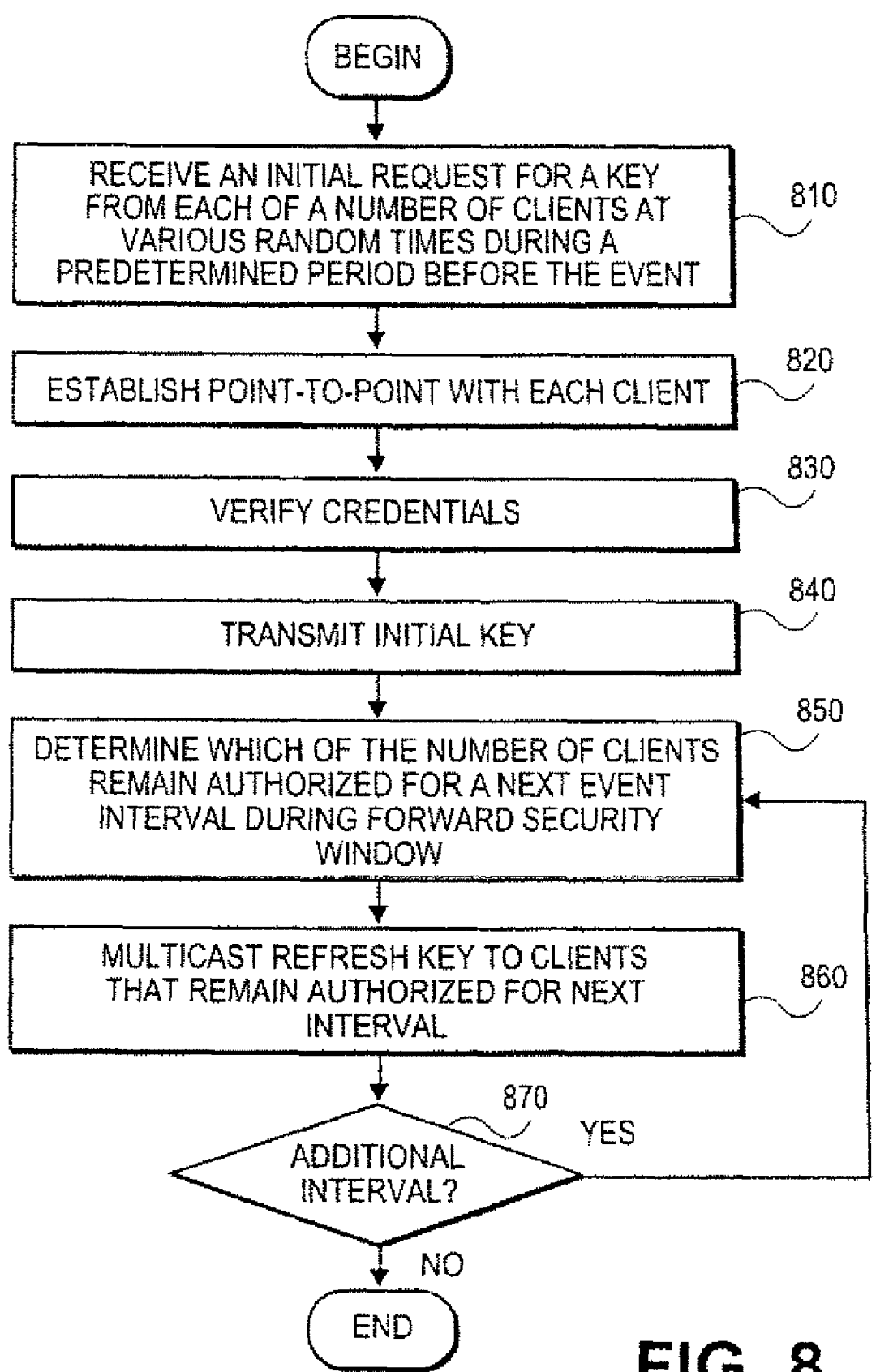
FIG. 8 demonstrates one embodiment of a key server.

FIG. 8 demonstrates another inventive embodiment of key server 140 in which refresh keys are sent by multicast rather than point-to-point. In block 810, a number of requests are received from several clients. As discussed above, the number of requests are randomly distributed over an initial keying period before the event starts. Blocks 820, 830, and 840 are similar to FIG. 5 wherein a point-to-point secure link is established, credentials are verified, and the initial key is transmitted to each authored requesting agent.

In block 850, the embodiment in FIG. 8 deviates from the embodiment in FIG. 5. In FIG. 5, the client initiates refresh requests. In the embodiment of FIG. 8, the key server determines which of the number of agents remain authorized for the next event interval based on the forward security window in block 850. In block 850, the key server multicasts the keys to the clients that remain authorized. Any number of multicasting techniques can be used. By "pushing" the refresh keys to the clients rather than pulling them (as in FIG. 5 above) the key server does not have to spend time waiting for refresh requests, establishing individual point-to-point connections, etc. In block 870, if there are no more additional event intervals, the process ends. If there are additional event intervals, the process loops back to block 850 to send the next multicast key based on the forward security window.

Figure 9:
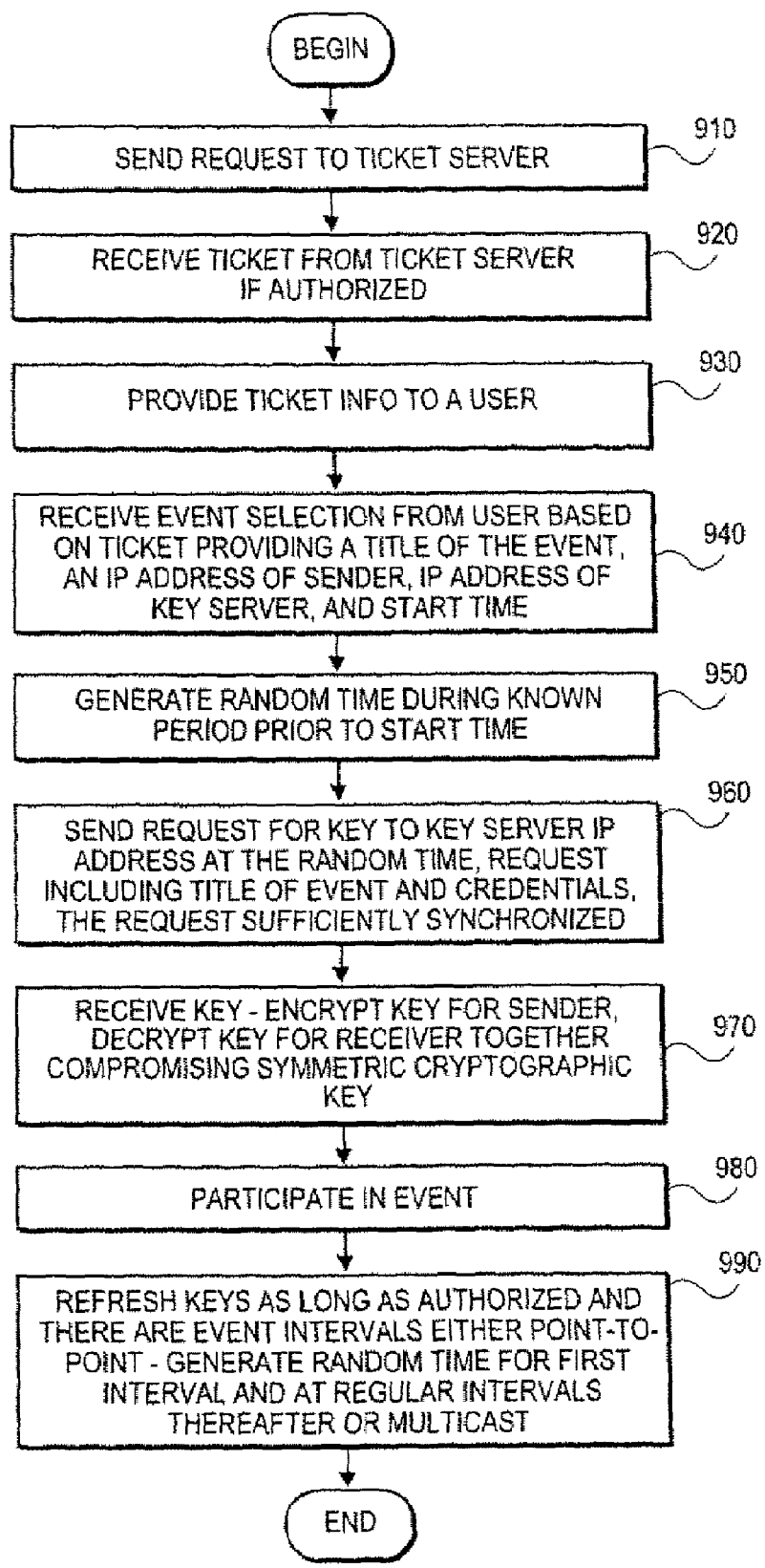
FIG. 9 demonstrates one embodiment of a client.

FIG. 9 demonstrates one inventive embodiment of a client system as it interacts with the ticket server and the key server. In block 910 the client sends a request to the ticket server. In block 920, the client receives a ticket back from the ticket server if the client is authorized to access the ticket server. In block 930, the client provides information taken from the ticket to a user. For instance, using an application program interface (API) to a graphical user interface, a user can view a representation of the events for which the client is eligible.

In block 940, the client receives a selection from the user. The selection indicates one or more of the events from the ticket. As discussed above, for each event, the ticket may include an identifier of the event, an IP address of the sender client, an IP address of the key server for the event, and a start time for the event.

In block 950, the client generates a random time during the initial keying interval and, in block 960, sends a request for a key to the key server at the random time. The request includes the identifier of the event and credentials to authenticate access authority. As discussed above, for sending clients, the time synchronization is important between the sending client and the key server.

In block 970, the client receives a key from the key server. If the client is a sending client, the key is used to encrypt the data. If the client is a receiving client, the key is used to decrypt data. In block 980, the client participates in the event by sending and/or receiving data. In block 990, the client continues to participate using refresh keys as long as the client remains authorized. The keys can be refreshed either point-to-point or multicast. For point-to-point, refresh requests are sent at a random time during a first event interval and then at regular intervals thereafter. Of course, as discussed above, in alternate embodiments the time for requests can be randomly generated for each event interval. For multicast, refresh keys are pushed to clients for each event interval until, for instance, the client is no longer authorized, the event ends, or the client indicates that it no longer wishes to participate.

Figure 10:
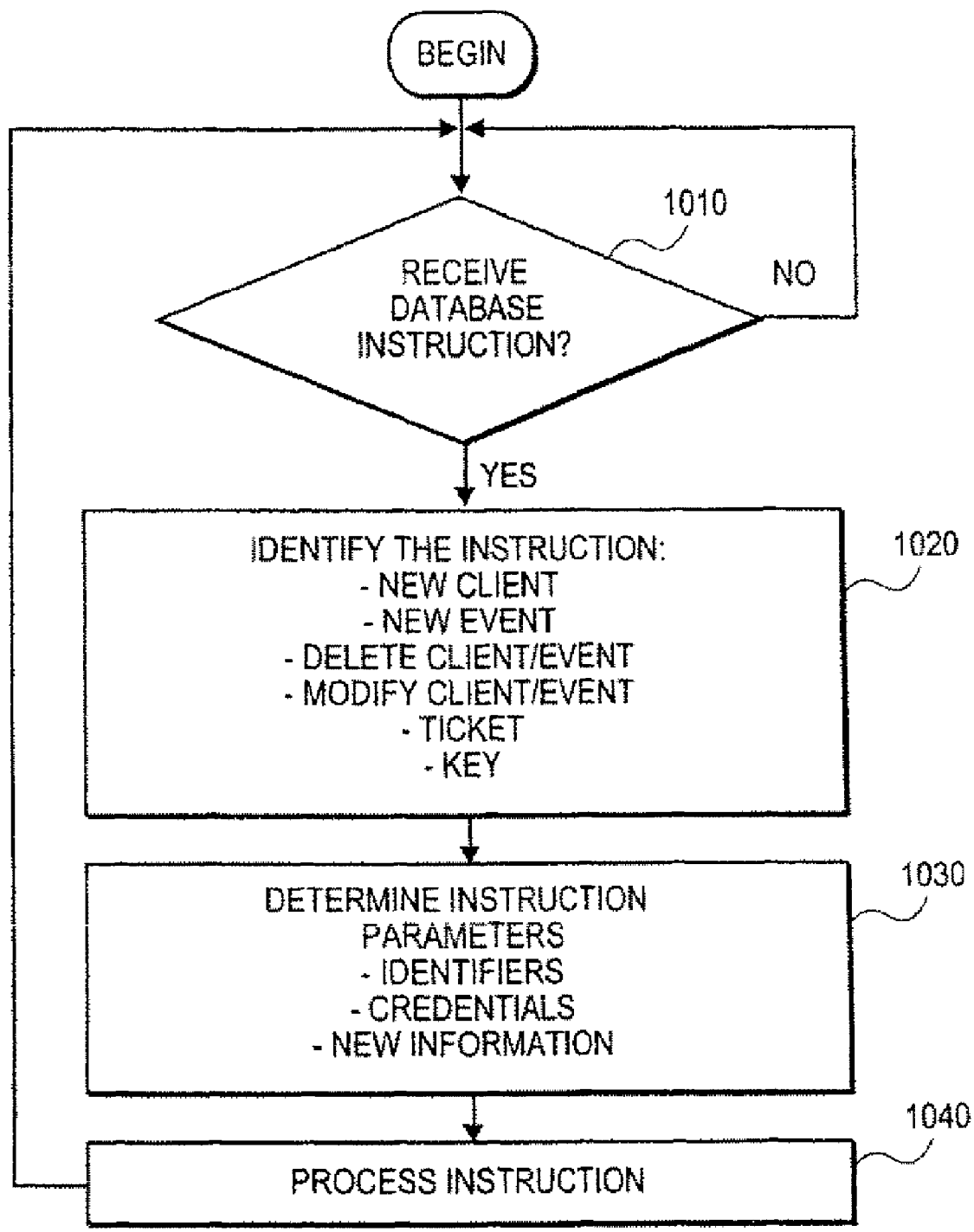
FIG. 10 demonstrates one embodiment of a management server.

FIG. 10 demonstrates one inventive embodiment of a procedure for updating and maintaining the data. In one embodiment, the procedure is performed by a management server such as management server 160 of FIG. 1. In block 1010, the management server waits for a new instruction. When a new instruction is received in block 1020, the management server identifies the instruction. In the illustrated embodiment, an instruction can be an instruction to add a new client, generate a ticket, provide a key, add a new event, delete a client or event, and modify a client or event. In block 1030, the management server identifies parameters for the instructions, such as client, event, and/or group identifiers, credentials for accessing a key, and new information for modifying old information. In block 1040, the management server processes the instruction and waits for a next instruction.

Figure 11:
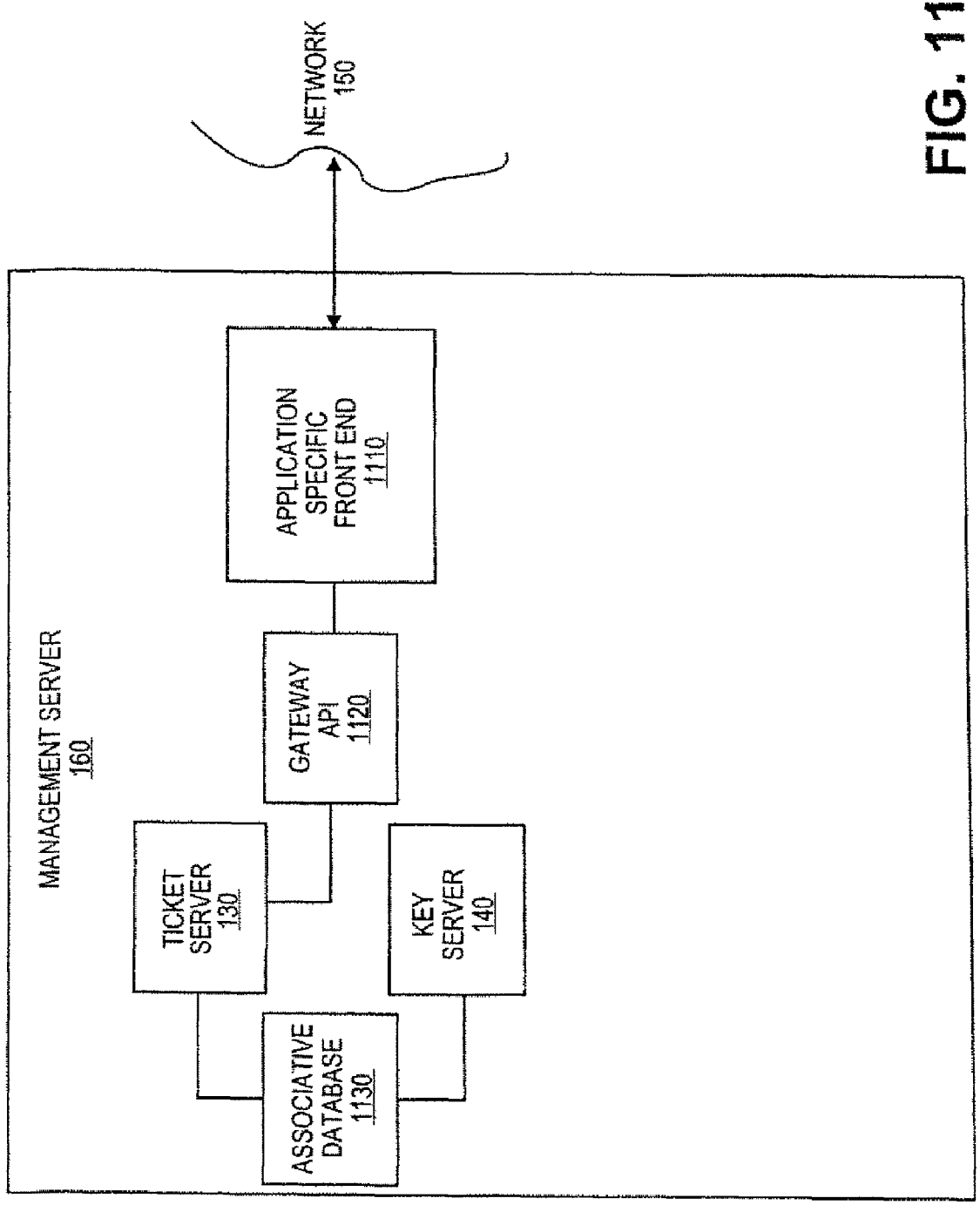
FIG. 11 illustrates one embodiment of a management server.

FIG. 11 illustrates one inventive embodiment of management server 160 including ticket server 130 and key server 140 in greater detail. In the illustrated embodiment, the severs 130 and 140 comprise a backend of the management server 160. An application specific front end 1110 handles client contact through network 150. Front end 1110 can represent any of a number of applications including a variety of e-commerce web applications, a virtual network interface for a private virtual network, etc. For instance, in one embodiment, application front end 1110 provides an e-commerce site where sending clients can post amateur audio content and receiving clients can listen to the audio content. Sending clients register with front end 1110 and submit events of audio data. As part of the registration process, the front end 1110 determines to which group or groups the sending client and the sending clients audio content should be added based on a classification of the audio content. The registration process can also include arrangements for payment, such as credit card approval, biographical information, etc.

Front end 1110 issues commands to the ticket server 130 through gateway application program interface (API) 1120. The commands, once they pass through gateway API 1120, are in a format usable by server 130 to manage data in the database. The commands may take the form of the commands described with reference to FIG. 10 previously. That is, commands to add, delete, and modify the contents of the database, such as the database illustrated in FIG. 3.

In FIG. 11, the servers 130 and 140 are shown both having access to the same database 1130. In the illustrated embodiment, the database can be used to store authorization relationships among clients and events as well as keys for accessing the various events. In alternate embodiments, such as those discussed above, the database is accessed and maintained by the ticket server alone. The key server maintains a separate database for matching requests for keys to particular events where, for instance, the key server is separately located for security purposes, and/or multiple key servers are used, each key server corresponding to only a subset of the total number of events.

Figure 12:
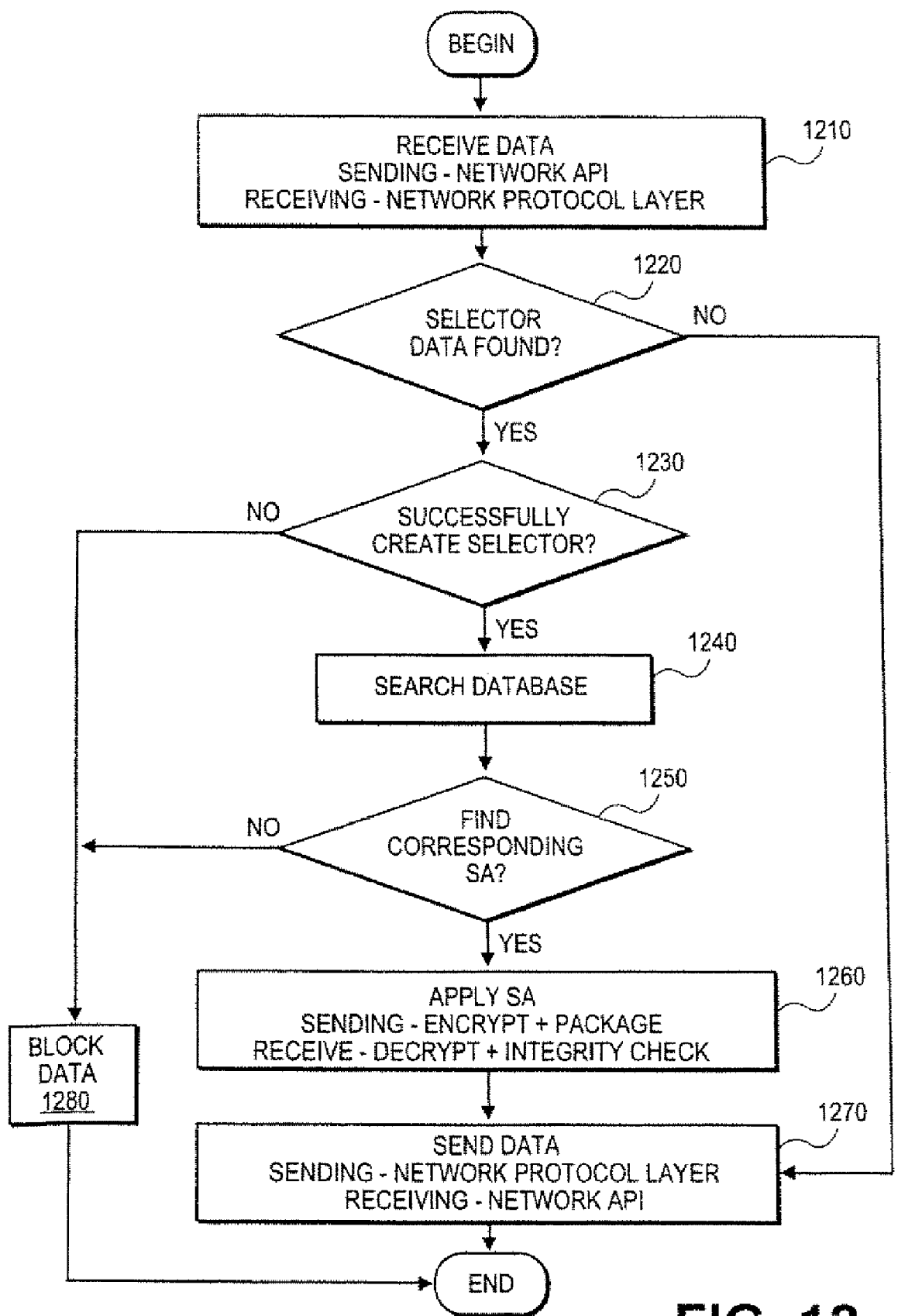
FIG. 12 demonstrates one embodiment of a security agent.

FIG. 12 demonstrates one inventive embodiment a security agent for implementing data security between two network entities, such as symmetric cryptographic keying. As discussed above, various embodiments of the inventions rely on symmetric cryptographic keying A standardized security protocol, Internet Protocol Security (IPsec), can be used to perform the functions needed for the various embodiments of the inventions. Unfortunately, IPsec is not yet widely available, and upgrading existing systems to provide IPsec support is costly and time consuming. The embodiment illustrated in FIG. 12 provides the needed security functionality at lower cost and increased simplicity.

The embodiment illustrated in FIG. 12 can be widely used for performing security operations on data between two network entities. The security agent is not limited to the networking environment described above with reference to FIG. 1, although it can be used in such an environment. As with other figures described herein, alternate embodiments may not require all of the elements, may include one or more additional elements, and may combine one or more elements shown in FIG. 12.

FIG. 12 demonstrates the functions of one security agent. A security agent works in concert with another security agent to provide symmetric network communications. That is, a sending agent applies one or more transformations to data and a receiving agent applies inverse transformations to reproduce the original data. In one embodiment, using a pair of security agents, "plaintext" data is transformed into "ciphertext" data, sent over a network, and transformed back into plaintext data.

In block 1210, the security agent receives data. In block 1220, the security agent searches the data for selector data. Depending on whether the data is outbound or inbound, selector data could include an IP address to which the data is directed, an IP address from which the data is received, a port to which the data is directed, and/or a port from which the data was received. Selector data can also include a tag in a security header, a failure to pass an integrity check, etc. If no selector data is found, the security agent presumes that the data is not related to the security agent's functions and passes the data along unchanged in block 1270.

If selector data is found in block 1220, the security agent then tries to create a selector from the selector data, A selector is part of a selector/security association pair otherwise known as keying information. For instance, as described above, when a client obtains a key from a key server, the key comprises a selector/security association pair that is to be used by both a sending client and a receiving client to secure participation in the corresponding event. The selector indicates what data should be operated on (namely the event data) as well as what security association should be used (in particular which encryption key should be used). In various embodiments, security associations are not limited strictly to encryption and decryption. Security associations may call for encryption, decryption, integrity check, or no action at all beyond removing any special packaging added to the data. One or more selectors/security associations pairs may be stored and applied to one or more events.

If the selector is not successfully created in block 1230, the data is prevented for going further in block 1280. This may happen where certain selector fields are detected in the data, but the data within those fields has been corrupted.

If, in block 1230, the selector is successfully created, the selector can be used to search a database that stores one or more selector/security association pairs to identify the corresponding security association in block 1240. If in block 1250 no corresponding security association is found, the data is prevented from proceeding in block 1280. Without a security association corresponding to the selector, the security agent cannot properly act on the data. Passing the data may cause various unintended consequences including system crashes.

If however, in block 1250, a corresponding security association was found, the security agent applies the security association to the data in block 1260. In block 1270, the data is passed along.

Figure 13:
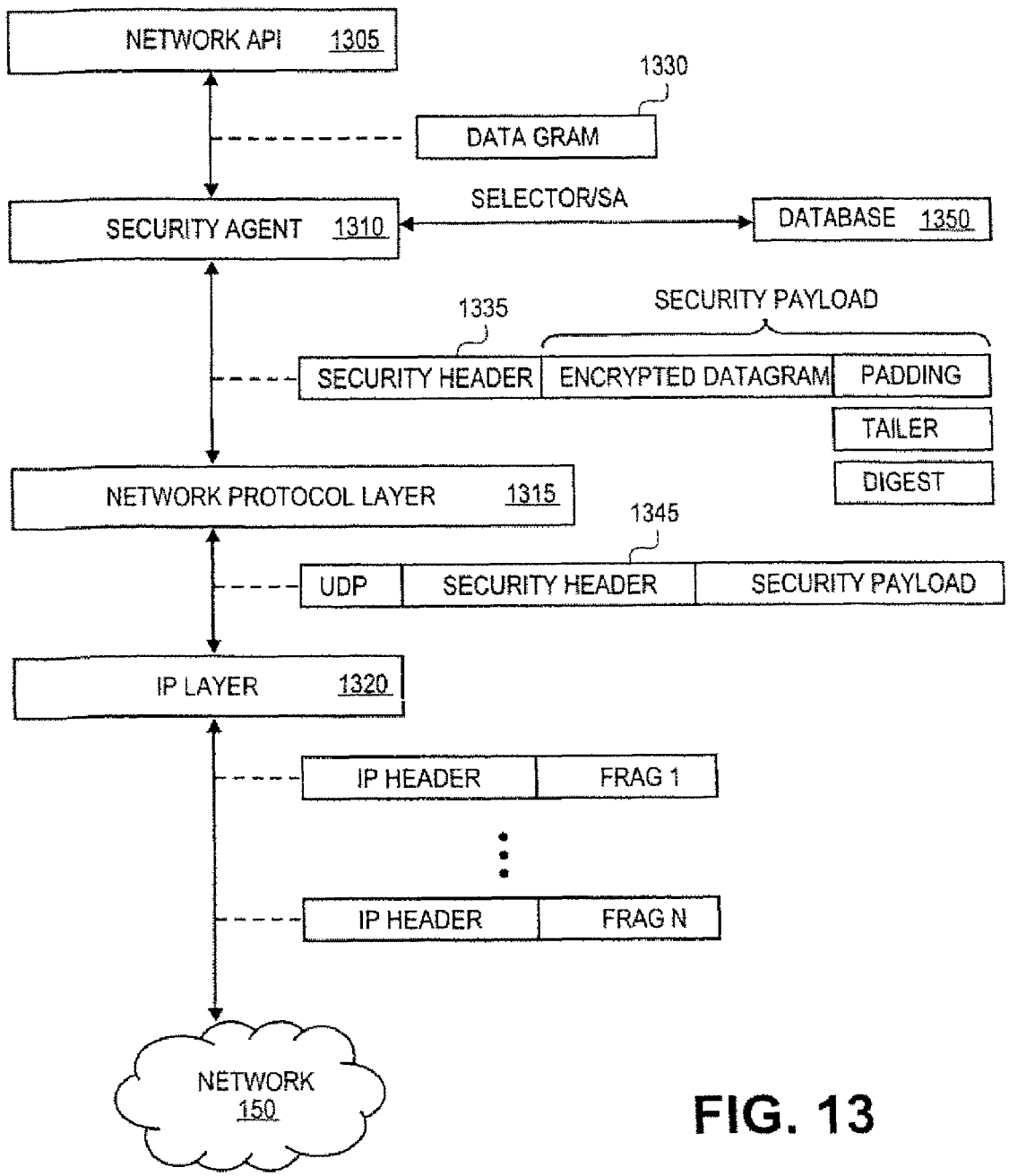
FIG. 13 illustrates one embodiment of a security agent.

FIG. 13 illustrates one embodiment of a security agent 1310 operating between the network API layer 1305 and network protocol layer 1315. Data traffic from an application (not shown) that is intended for network 150 goes through network API layer 1305 and arrives at security agent 1310 in the form of a data-gram 1330. If security agent 1310 can identify a selector in data-gram 1330 and identify a corresponding security association in database 1350, security agent 1310 will apply the security association to data-gram 1330. In the illustrated embodiment, the result is data packet 1335 which includes a special security header and security payload. The security payload includes the encrypted data gram, padding, a security trailer, and a digest.

The data packet 1335 goes through network protocol layer 1315 as if it were regular data, and is placed in data packet 1345. IP layer 1320 fragments the data as needed, attaches IP headers, and sends the data onto network 150.

For inbound traffic, IP layer 1320 reassembles the data and strips off the IP headers. Network protocol layer 1315 strips off its header and passes the data packet 1335 to security agent 1310. Assuming security agent 1310 is able locate a corresponding security association in database 1350 based on a selector created from the data, security agent 1310 reverses any security operations on the data. If no selector is found, then no security operations were done to the data so no operations need to be reversed.

The operations of security agent 1310 are transparent to the network API 1305 and the network protocol layer. The security agent works completely independent of the network or the application based on selector/security associations previously stored in database 1350.

Where the security agent of FIGS. 12 and/or 13 is used in combination with the networking environment of FIG. 1, the database of selector/security association pairs is populated by a client when the client access key server 140 and receives keying information.

Figure 14:
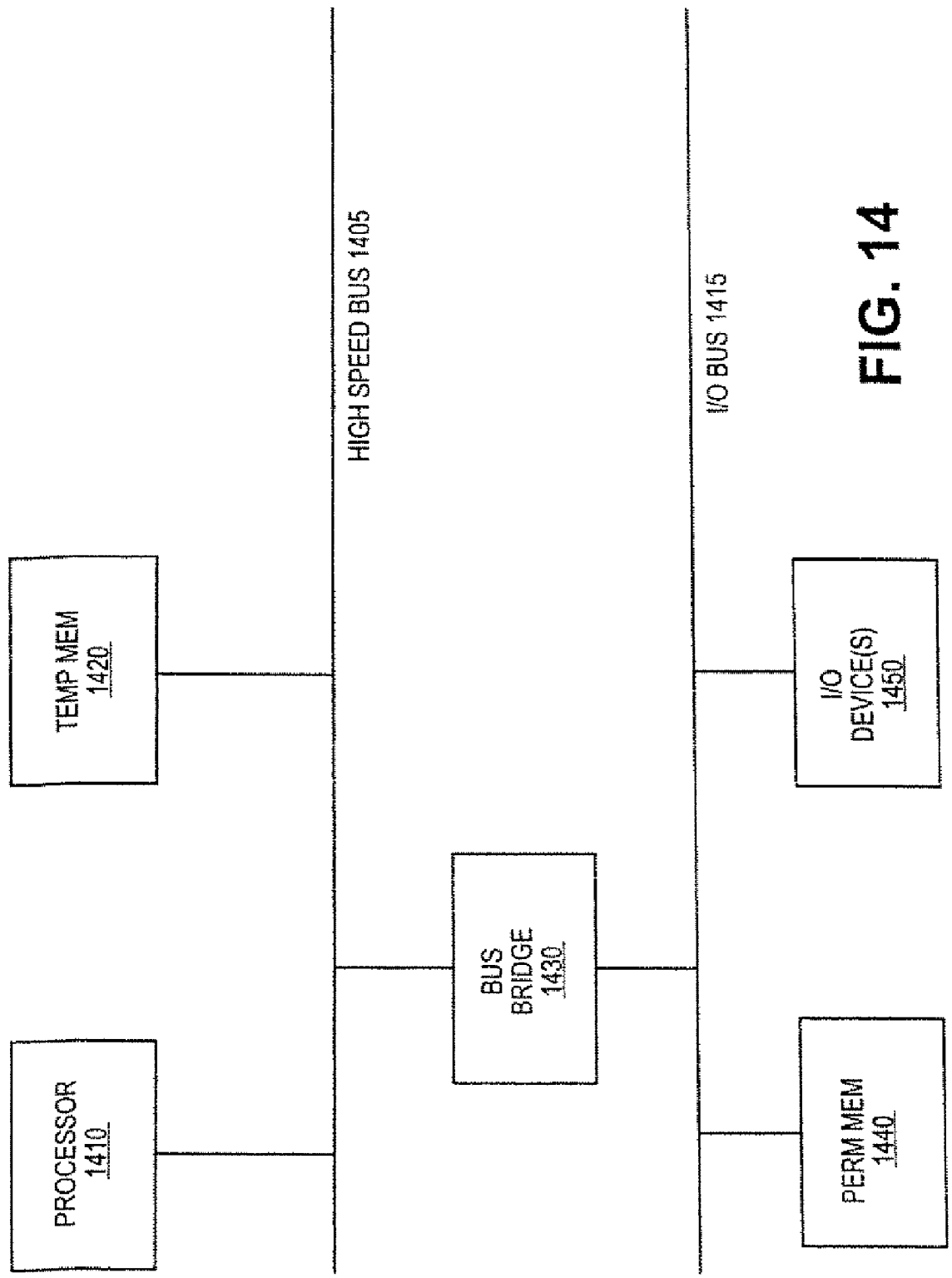
FIG. 14 illustrates one embodiment of a hardware system.

FIG. 14 illustrates one embodiment of a hardware system intended to represent a broad category of computer systems such as personal computers, workstations, and/or embedded systems. In the illustrated embodiment, the hardware system includes processor 1410 coupled to high speed bus 1405, which is coupled to input/output (I/O) bus 1415 through bus bridge 1430. Temporary memory 1420 is coupled to bus 1405. Permanent memory 1440 is coupled to bus 1415. I/O device(s) 1450 is also coupled to bus 1415. I/O device(s) 1450 may include a display device, a keyboard, one or more external network interfaces, etc.

Certain embodiments may include additional components, may not require all of the above components, or may combine one or more components. For instance, temporary memory 1420 may be on-chip with processor 1410. Alternately, permanent memory 1440 may be eliminated and temporary memory 1420 may be replaced with an electrically erasable programmable read only memory (EEPROM), wherein software routines are executed in place from the EEPROM. Some implementations may employ a single bus, to which all of the components are coupled, or one or more additional buses and bus bridges to which various components can be coupled. Those skilled in the art will be familiar with a variety of alternate internal networks including, for instance, an internal network based on a high speed system bus with a memory controller hub and an I/O controller hub. Additional components may include additional processors, a CD ROM drive, additional memories, and other peripheral components known in the art.

Figure 15:
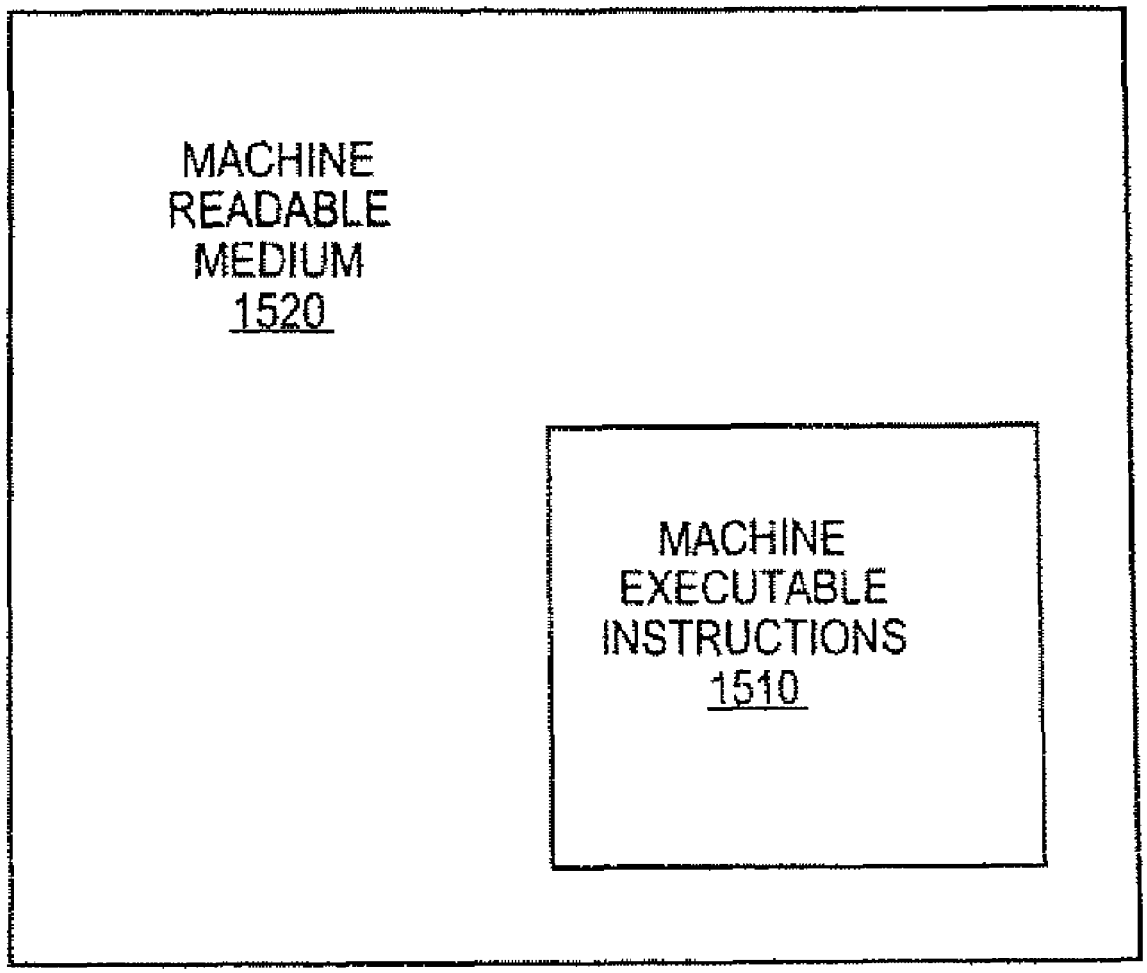
FIG. 15 illustrates one embodiment of a machine readable storage medium.

In one embodiment, the one or more of the inventive embodiments, as described above, is implemented using one or more computers such as the hardware system of FIG. 14. Where more than one computer is used, the systems can be coupled to communicate over an external network, such as a local area network (LAN), an IP network, etc. In one embodiment, the present invention is implemented as software routines executed by the computer(s). For a given computer, the software routines can be stored on a storage device, such as permanent memory 1440. Alternately, as shown in FIG. 15, the software routines can be machine executable instructions 1510 stored using any machine readable storage medium 1520, such as a diskette, CD-ROM, magnetic tape, digital video or versatile disk (DVD), laser disk, ROM, Flash memory, etc. The series of instructions need not be stored locally, and could be received from a remote storage device, such as a server on a network, a CD ROM device, a floppy disk, etc., through, for instance, I/O device 1450. The instructions may be copied from the storage device into temporary memory 1420 and then accessed and executed by processor 1410. In one implementation, these software routines are written in the C programming language. It is to be appreciated, however, that these routines may be implemented in any of a wide variety of programming languages.

In alternate embodiments, the present invention is implemented in discrete hardware or firmware. For example, one or more application specific integrated circuits (ASICs) could be programmed with the above described functions of the present invention. In another example, the present invention could be implemented in one or more ASICs on additional circuit boards and the circuit boards could be inserted into the computer(s) described above. In another example, field programmable gate arrays (FPGAs) or static programmable gate arrays (SPGA) could be used to implement the present invention. In yet another example, a combination or hardware and software could be used to implement the present invention.

Thus, a method and apparatus for network communications security is described. Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the claims.

What is claimed is:

1. A computer program product embodied on at least one non-transitory computer readable storage medium for use with at least one computer processor for implementing data security in a transfer of an event from a sending client to a receiving client located remotely therefrom across a network, the network further including a key server located remotely from each of the sending and receiving clients, the computer program product comprising:
   (a) computer code for receiving, at each of the sending and receiving clients, keying information associated with the event from the key server, the keying information including a plurality of selector/security association pairs corresponding to different timewise intervals of the event;
   (b) computer code for populating, at the sending client, a first database of selector/security association pairs local to the sending client using said keying information received from the key server;
   (c) computer code for populating, at the receiving client, a second database of selector/security association pairs local to the receiving client using said keying information received from the key server;
   (d) computer code for receiving, at the sending client, first data from a network application program interface (API) of the sending client, the first data comprising a portion of the event to be sent from the sending client to the receiving client;
   (e) computer code for determining, at the sending client, whether the first data is eligible for a first security operation, wherein eligibility is determined by first selector data contained in the first data;
   (f) computer code for creating, at the sending client, a first selector based on the first selector data and using said first selector to search the first database for at least one selector/security association pair identifying a first security association corresponding to the first selector;
   (g) computer code for applying, at the sending client, the first security operation to the first data if the first data is eligible, wherein said computer code for applying the first security operation comprises computer code for using the first security association on the at least a portion of the first data;

(h) computer code for sending, at the sending client, the first data to which the first security operation has been applied to a network protocol layer of the sending client for transfer over the network and reception by a network protocol layer of the receiving client;

(i) computer code for receiving, at the receiving client, second data from the network protocol layer of the receiving client, the second data including the first data to which the first security operation has been applied;

(j) computer code for determining, at the receiving client, whether said second data is eligible for a second security operation, wherein eligibility is determined by second selector data contained in the second data;

(k) computer code for creating, at the receiving client, a second selector based on the second selector data and using said second selector to search the second database for at least one selector/security association pair identifying a second security association corresponding to the second selector;

(l) computer code for applying, at the receiving client, the second security operation to the second data if the second data is eligible, wherein said computer code for applying the second security operation comprises computer code for using the second security association on the at least a portion of the second data; and (m) computer code for sending, at the receiving client, the second data to which the second security operation has been applied to a network API of the receiving client.

2. The computer program product of claim 1, wherein the first selector data is based at least in part on one of an internet protocol address taken from the first data and a port indicator taken from the first data.

3. The computer program product of claim 1, wherein said computer code for applying the first security operation comprises at least one of computer code for attaching a header to the first data, said header including a security operation tag, and computer code for encrypting the first data.

4. The computer program product of claim 1, wherein said computer code for determining if the second data is eligible for the second security operation comprises at least one of computer code for detecting a security operation tag in a header of the second data, and computer code for detecting failure of an integrity check on the second data.

5. The computer program product of claim 1, wherein said computer code for determining if the second data is eligible for the second security operation comprises computer code for determining that the second data is not eligible for the second security operation if the second selector cannot be created based on the second selector data, said second data being sent to the network API of the receiving client without an applied security operation if it is so determined that the second data is not eligible.

6. The computer program product of claim 1, wherein said computer code for using the second security association comprises at least one of computer code for applying encryption to the second data, computer code for removing special packaging from the second data, computer code for applying decryption to the second data, and computer code for performing an integrity check on the second data.

7. The computer program product of claim 1, wherein said timewise intervals of said event are relatively short compared to an overall duration of said event.

8. The computer program product of claim 7, wherein said computer code for applying the first security operation at the sending client comprises computer code for encrypting the first data using a first symmetric encryption key from the first database, and wherein said computer code for applying the second security operation at the receiving client comprises computer code for reversing said first security operation using a second symmetric encryption key from the second database corresponding to said first symmetric encryption key.

9. A computer program product embodied on at least one non-transitory computer readable storage medium for use with at least one computer processor at a sending client for implementing data security in a transfer of an event from the sending client to a receiving client located remotely therefrom across a network, the network further including a key server located remotely from each of the sending and receiving clients, the computer program product comprising:

computer code for receiving data from a network application program interface (API) of the sending client, the data comprising a portion of the event to be sent from the sending client to the receiving client;

computer code for determining if the data is eligible for a security operation, wherein eligibility is determined by selector data contained in the data;

computer code for creating a selector based on the selector data and using said selector to search a local sending client database of security associations for at least one selector/security association pair identifying a security association corresponding to the selector, said local sending client database storing a plurality of selector/security association pairs received from the key server corresponding to different timewise intervals of said event;

computer code for applying the security operation to the data if the data is eligible, wherein said computer code for applying the security operation comprises computer code for using the security association on the at least a portion of the data; and computer code for sending the data to which the security operation has been applied to a network protocol layer of the sending client.

10. The computer program product of claim 9, wherein the selector data is based at least in part on one of an internet protocol address taken from the data and a port indicator taken from the data.

11. The computer program product of claim 9, wherein said computer code for applying the security operation comprises at least one of computer code for attaching a header to the data, said header including a security operation tag, and computer code for encrypting the data.

12. The computer program product of claim 9, wherein said timewise intervals of said event are relatively short compared to an overall duration of said event.

13. A computer program product embodied on at least one non-transitory computer readable storage medium for use with at least one computer processor at a receiving client for implementing data security in a transfer of an event to the receiving client from a sending client located remotely therefrom across a network, the network further including a key server located remotely from each of the sending and receiving clients, the computer program product comprising:

computer code for receiving data from a network protocol layer of the receiving client, the data comprising a portion of the event being received at the receiving client;

computer code for determining if the data is eligible for a security operation, wherein eligibility is determined by selector data contained in the data;

computer code for creating a selector based on the selector data and using said selector to search a local receiving client database of security associations for at least one selector/security association pair identifying a security association corresponding to the selector, said local receiving client database storing a plurality of selector/ security association pairs received from the key server corresponding to different timewise intervals of said event;

computer code for applying the security operation to the data if the data is eligible, wherein said computer code for applying the security operation comprises computer code for using the security association on the at least a portion of the data; and computer code for sending the data to which the security operation has been applied to a network API of the receiving client.

14. The computer program product of claim 13, wherein said computer code for determining if the data is eligible for a security operation comprises at least one of computer code for detecting a security operation tag in a header of the data, and computer code for detecting failure of an integrity check on the data.

15. The computer program product of claim 13, further comprising computer code for blocking the data from being sent to the network API if no security association corresponding to the selector is found.

16. The computer program product of claim 13, wherein said computer code for determining if the data is eligible for the security operation comprises computer code for determining that the data is not eligible for the security operation if the selector cannot be created based on the selector data, the data being sent to the network API of the receiving client without an applied security operation if it is so determined that the data is not eligible.

17. The computer program product of claim 13, further comprising computer code for blocking the data from being sent to the network API if the data includes selector data but no selector can be created from it.

18. The computer program product of claim 13, wherein said computer code for using the security association comprises at least one of computer code for applying encryption to the data, computer code for removing special packaging from the data, computer code for applying decryption to the data, and computer code for performing an integrity check on the data.

19. The computer program product of claim 13, wherein said timewise intervals of said event are relatively short compared to an overall duration of said event.

20. The computer program product of claim 19, wherein said computer code for applying the security operation to the data comprises computer code for reversing a previous security operation applied to the data by the sending client.

21. A system for implementing data security in a transfer of an event from a sending client to a receiving client located remotely therefrom across a network, the sending client including a first processor and the receiving client including a second processor, the network further including a key server located remotely from each of the sending and receiving clients, the system comprising:

a first memory associated with said first processor and storing first instructions that, when executed by said first processor, cause the first processor to perform steps comprising:

receiving keying information associated with the event from the key server, the keying information including a plurality of selector/security association pairs corresponding to different timewise intervals of the event;

populating a first database of selector/security association pairs local to the sending client using said keying information;

receiving first data from a network application program interface (API) of the sending client, the first data comprising a portion of the event to be sent from the sending client to the receiving client;

determining whether the first data is eligible for a first security operation, wherein eligibility is determined by first selector data contained in the first data;

creating a first selector based on the first selector data and use said first selector to search the first database for at least one selector/security association pair identifying a first security association corresponding to the first selector;

applying the first security operation to the first data if the first data is eligible, said applying the first security operation comprising using the first security association on the at least a portion of the first data; and sending the first data to which the first security operation has been applied to a network protocol layer of the sending client for transfer over the network and reception by a network protocol layer of the receiving client; and a second memory associated with said second processor and storing second instructions that, when executed by said second processor, cause the second processor to perform steps comprising:

receiving said keying information from said key server;

populating a second database of selector/security association pairs local to the receiving client using said keying information;

receiving second data from the network protocol layer of the receiving client, the second data including the first data to which the first security operation has been applied;

determining whether said second data is eligible for a second security operation, wherein eligibility is determined by second selector data contained in the second data;

creating a second selector based on the second selector data and using said second selector to search the second database for at least one selector/security association pair identifying a second security association corresponding to the second selector;

applying the second security operation to the second data if the second data is eligible, said applying the second security operation comprising using the second security association on the at least a portion of the second data; and sending the second data to which the second security operation has been applied to a network API of the receiving client.

22. The system of claim 21, wherein the first selector data is based at least in part on one of an internet protocol address taken from the first data and a port indicator taken from the first data.

23. The system of claim 21, wherein said applying the first security operation comprises at least one of attaching a header to the first data, said header including a security operation tag, and encrypting the first data.

24. The system of claim 21, wherein said determining if the second data is eligible for the second security operation comprises at least one of detecting a security operation tag in a header of the second data, and detecting failure of an integrity check on the second data.

25. The system of claim 21, wherein said determining if the second data is eligible for the second security operation comprises determining that the second data is not eligible for the second security operation if the second selector cannot be created based on the second selector data, and wherein said second data is sent to the network API of the receiving client without an applied security operation if it is so determined that the second data is not eligible.

26. The system of claim 21, wherein the second security association comprises at least one of applying encryption to the second data, removing special packaging from the second data, applying decryption to the second data, and performing an integrity check on the second data.

27. The system of claim 21, wherein said timewise intervals of said event are relatively short compared to an overall duration of said event.

28. The system of claim 27, wherein said applying the first security operation comprises encrypting the first data using a first symmetric encryption key from the first database, and wherein said applying the second security operation comprises reversing said first security operation using a second symmetric encryption key from the second database corresponding to said first symmetric encryption key.

29. A system for implementing data security in a transfer of an event from a sending client to a receiving client located remotely therefrom across a network, the sending client including a processor, the network further including a key server located remotely from each of the sending and receiving clients, the system comprising a memory associated with the processor and storing instructions that, when executed by said processor, cause the processor to perform steps comprising:
   receiving data from a network application program interface (API) of the sending client, the data comprising a portion of the event to be sent from the sending client to the receiving client;
   determining whether the data is eligible for a security operation, wherein eligibility is determined by selector data contained in the data;
   creating a selector based on the selector data and using said selector to search a local sending client database of security associations for at least one selector/security association pair identifying a security association corresponding to the selector, said local sending client database storing a plurality of selector/security association pairs received from the key server corresponding to different timewise intervals of said event;
   applying the security operation to the data if the data is eligible, wherein applying the security operation comprises using the security association on the at least a portion of the data; and
   sending the data to which the security operation has been applied to a network protocol layer of the sending client.

30. The system of claim 29, wherein the selector data is based at least in part on one of an internet protocol address taken from the data and a port indicator taken from the data.

31. The system of claim 29, wherein said applying the security operation comprises at least one of attaching a header to the data, said header including a security operation tag, and encrypting the data.

32. The system of claim 29, wherein said timewise intervals of said event are relatively short compared to an overall duration of said event.

33. A system for implementing data security in a transfer of an event from a sending client to a receiving client located remotely therefrom across a network, the receiving client including a processor, the network further including a key server located remotely from each of the sending and receiving clients, the system comprising a memory associated with the processor and storing instructions that, when executed by said processor, cause the processor to perform steps comprising:
   receiving data from a network protocol layer of the receiving client, the data comprising a portion of the event being received at the receiving client;
   determining whether the data is eligible for a security operation, wherein eligibility is determined by selector data contained in the data;
   creating a selector based on the selector data and using said selector to search a local receiving client database of security associations for at least one selector/security association pair identifying a security association corresponding to the selector, said local receiving client database storing a plurality of selector/security association pairs received from the key server corresponding to different timewise intervals of said event;
   applying the security operation to the data if the data is eligible, wherein said applying the security operation comprises using the security association on the at least a portion of the data; and
   sending the data to which the security operation has been applied to a network API of the receiving client.

34. The system of claim 33, wherein determining if the data is eligible for a security operation comprises at least one of detecting a security operation tag in a header of the data, and detecting failure of an integrity check on the data.

35. The system of claim 33, further comprising blocking the data from being sent to the network API if no security association corresponding to the selector is found.

36. The system of claim 33, wherein determining whether the data is eligible for the security operation comprises determining that the data is not eligible for the security operation if the selector cannot be created based on the selector data, and wherein said data is sent to the network API of the receiving client without an applied security operation if it is so determined that the data is not eligible.

37. The system of claim 33, further comprising blocking the data from being sent to the network API if the data includes selector data but no selector can be created from it.

38. The system of claim 33, wherein the security association comprises at least one of applying encryption to the data, removing special packaging from the data, applying decryption to the data; and performing an integrity check on the data.

39. The system of claim 33, wherein said timewise intervals of said event are relatively short compared to an overall duration of said event.

40. The system of claim 39, wherein said applying the security operation to the data comprises reversing a previous security operation applied to the data by the sending client.

* * * * *